(12) United States Patent
Chung et al.

(10) Patent No.: US 8,811,262 B2
(45) Date of Patent: Aug. 19, 2014

(54) METHOD IN WHICH A RELAY ALLOCATES CARRIERS ON A BACKHAUL LINK AND AN ACCESS LINK IN A MULTI-CARRIER WIRELESS COMMUNICATION SYSTEM

(75) Inventors: Jae Hoon Chung, Anyang-si (KR); Yeong Hyeon Kwon, Anyang-si (KR); Sung Ho Moon, Anyang-si (KR); Kyu Jin Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 450 days.

(21) Appl. No.: 13/375,984

(22) PCT Filed: Jun. 8, 2010

(86) PCT No.: PCT/KR2010/003666
§ 371 (c)(1),
(2), (4) Date: Dec. 2, 2011

(87) PCT Pub. No.: WO2010/143867
PCT Pub. Date: Dec. 16, 2010

(65) Prior Publication Data
US 2012/0069795 A1 Mar. 22, 2012

Related U.S. Application Data

(60) Provisional application No. 61/185,188, filed on Jun. 8, 2009, provisional application No. 61/266,509, filed on Dec. 4, 2009.

(51) Int. Cl.
*H04B 7/14* (2006.01)

(52) U.S. Cl.
USPC .......................................................... 370/315

(58) Field of Classification Search
CPC ....... H04W 84/18; H04W 4/00; H04W 28/00; H04W 28/02; H04W 36/00; H04W 84/12; H04W 88/00

USPC .............. 370/310, 310.5, 313, 315, 328, 329, 370/331, 338, 431, 432, 445, 464, 465
See application file for complete search history.

(56) References Cited

U.S. PATENT DOCUMENTS

| 8,031,583 | B2 * | 10/2011 | Classon et al. ................. 370/208 |
| 2008/0107062 | A1 | 5/2008 | Viorel et al. |
| 2009/0147706 | A1 * | 6/2009 | Yu et al. ......................... 370/277 |
| 2010/0232373 | A1 * | 9/2010 | Nory et al. ..................... 370/329 |

FOREIGN PATENT DOCUMENTS

| KR | 2008-0040616 | 5/2008 |
| KR | 10-0884744 B | 2/2009 |
| KR | 2009-0052773 | 5/2009 |

OTHER PUBLICATIONS

International Search Report for PCT/KR2010/003666.

* cited by examiner

*Primary Examiner* — Anh Ngoc Nguyen
(74) *Attorney, Agent, or Firm* — Morgan, Lewis & Bockius LLP

(57) ABSTRACT

The present invention relates to a wireless communication system, and more particularly, discloses a method and apparatus in which a relay allocates carriers on a backhaul link and an access link in a multi-carrier wireless communication system. The method in which the relay allocates resources in a multi-carrier wireless communication system in accordance with one embodiment of the present invention, comprises: determining a subframe pattern allocated on a first uplink component carrier to enable a backhaul uplink transmission from the relay to a base station; determining a subframe requiring reception of an access uplink from user equipment to the relay on the first uplink component carrier in accordance with a synchronous HARQ operation; and transmitting resource allocation control information containing carrier switching indicating information to the user equipment in the event the subframe requiring reception of an access uplink is determined to be the same as the subframe allocated for backhaul uplink transmission on the first uplink component carrier.

14 Claims, 13 Drawing Sheets

(a)

(b)

METHOD IN WHICH A RELAY ALLOCATES CARRIERS ON A BACKHAUL LINK AND AN ACCESS LINK IN A MULTI-CARRIER WIRELESS COMMUNICATION SYSTEM

This application is a national stage application of PCT Application No. PCT/KR2010/003666, filed on Jun. 8, 2010, which claims the benefit of U.S. Provisional Application Nos. 61/185,188, filed Jun. 8, 2009, and 61/266,509, filed Dec. 4, 2009, all of which are hereby incorporated by reference.

TECHNICAL FIELD

The present invention relates to a wireless communication system and more particularly, to a method and apparatus for allocating carriers to a backhaul link and an access link at a relay in a multi-carrier wireless communication system.

BACKGROUND ART

FIG. 1 illustrates a Relay Node (RN) 120 and User Equipments (UEs) 131 and 132 within the coverage of an evolved Node B (eNode B or eNB) 110 in a wireless communication system 100. The RN 120 may transmit data received from the eNode B 110 to the UE 132 within its relay coverage and data received from the UE 132 to the eNode B 110. The RN may also extend a high-data rate area, increase the communication quality of a cell edge, and support a communication service inside a building or in an area outside the coverage of the eNode B 110. In the illustrated case of FIG. 1, a UE (Macro-UE) that receives a service directly from the eNode B 110 such as the UE 131 co-exists with a UE (Relay-UE) that receives a service from the RN 120 such as the UE 132.

A radio link between an eNode B and an RN is called a backhaul link. A link directed from the eNode B to the RN and a link directed from the RN to the eNode B are called a backhaul downlink and a backhaul uplink, respectively. A radio link between an RN and a UE is called an access link. A link directed from the RN to the UE and a link directed from the UE to the RN are called an access downlink and an access uplink, respectively.

Although a downlink and an uplink have different bandwidths in a typical wireless communication system, use of only one carrier is considered for each of the downlink and the uplink. For example, a single-carrier wireless communication system may be provided, in which each of a downlink and an uplink has a single carrier and the bandwidths of the downlink and the uplink are generally symmetrical.

The International Telecommunication Union (ITU) requires that an IMT-Advanced candidate technology supports an extended bandwidth, compared to the legacy wireless communication systems. However, it is not easy to allocate a frequency having a broad band all around the world except some regions. Accordingly, as a technology for efficiently utilizing narrow frequency band fragments, Carrier Aggregation (CA, i.e. bandwidth aggregation) or spectrum aggregation has been developed to create the effect of using a logical broad band by physically aggregating a plurality of bands in the frequency domain.

CA is introduced to support increased throughput, to prevent a cost increase caused by the use of broadband Radio Frequency (RF) devices, and to ensure backward compatibility with the legacy systems. CA is a technology of enabling data exchange between a UE and an eNode B in a group of a plurality of carriers each having a bandwidth unit as defined in a legacy wireless communication system (i.e. a Long Term Evolution (LTE) system for an LTE-Advanced (LTE-A) system or an Institute of Electrical and Electronics Engineers (IEEE) 802.16e system for an IEEE 802.16m system). A carrier having a bandwidth unit as defined in the legacy wireless communication system is called a Component Carrier (CC). For example, although one CC supports a bandwidth of 5 MHz, 10 MHz, or 20 MHz, CA can support a system bandwidth of up to 100 MHz by aggregating up to 5 CCs.

The above-described CA technology can be applied to transmission and reception on a backhaul link between an eNode B and an RN and/or transmission and reception on an access link between an RN and a UE. However, a technique for configuring and assigning system transmission resources, which supports combination and/or adaptation of these two technologies, is yet to be specified.

DISCLOSURE

Technical Problem

An object of the present invention is to provide a method for configuring and assigning carriers for transmission and reception on a backhaul link and an access link, a method for efficiently multiplexing a backhaul link with an access link, and a method for preventing collision between transmission and reception on a backhaul link and transmission and reception on an access link.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for allocating resources at a Relay Node (RN) in a multi-carrier supporting wireless communication system includes determining a subframe pattern for backhaul uplink transmission from the RN to a Base Station (BS) on a first uplink Component Carrier (CC), determining a subframe requiring access uplink reception from a User Equipment (UE) at the RN on the first uplink CC according to a synchronous Hybrid Automatic Repeat reQuest (HARQ) operation, and transmitting resource allocation control information including carrier switching indication information to the UE, if a subframe allocated for the backhaul uplink transmission is identical to the subframe requiring access uplink reception from the UE at the RN.

The carrier switching indication information may include information indicating that the subframe requiring access uplink reception according to the synchronous HARQ operation is allocated to a second uplink CC.

In addition, the carrier switching indication information may include at least one of information about an index of the second uplink CC and carrier switching triggering information.

The subframe requiring access uplink reception on the first uplink CC may be a subframe for reception of access uplink retransmission data according to the synchronous HARQ operation, and the resource allocation control information may be an uplink grant.

The subframe requiring access uplink reception on the first uplink CC may be a subframe for feedback reception in response to transmitted access downlink data according to the synchronous HARQ operation, and the resource allocation control information may be a downlink assignment for the backhaul downlink data transmission.

The subframe pattern for backhaul uplink transmission on the first uplink CC may form a subframe pattern for backhaul downlink reception on the first downlink CC and an HARQ operation.

The subframe pattern for backhaul downlink reception on the first downlink CC may be a 10 ms-period pattern or a 40 ms-period pattern in subframes other than subframes in which configuration of MBSFN subframes are restricted.

In another aspect of the present invention, an RN for allocating resources in a multi-carrier supporting wireless communication system includes a reception module for receiving a backhaul downlink signal from a BS and receiving an access uplink signal from a UE, a transmission module for transmitting a backhaul uplink signal to the BS and transmitting an access downlink signal to the UE, and a processor for controlling the reception module and the transmission module. The processor is configured to determine a subframe pattern for backhaul uplink transmission from the RN to the BS on a first uplink CC, to determine a subframe requiring access uplink reception from the UE at the RN on the first uplink CC according to a synchronous HARQ operation, and to transmit resource allocation control information including carrier switching indication information to the UE, if a subframe allocated for the backhaul uplink transmission is identical to the subframe requiring access uplink reception from the UE at the RN.

The carrier switching indication information may include information indicating that the subframe requiring access uplink reception according to the synchronous HARQ operation is allocated to a second uplink CC.

In addition, the carrier switching indication information may include at least one of information about an index of the second uplink CC and carrier switching triggering information.

The subframe requiring access uplink reception on the first uplink CC may be a subframe for reception of access uplink retransmission data according to the synchronous HARQ operation, and the resource allocation control information may be an uplink grant.

The subframe requiring access uplink reception on the first uplink CC may be a subframe for feedback reception in response to transmitted access downlink data according to the synchronous HARQ operation, and the resource allocation control information may be a downlink assignment for the backhaul downlink data transmission.

The subframe pattern for backhaul uplink transmission on the first uplink CC may form a subframe pattern for backhaul downlink reception on a first downlink CC and an HARQ operation.

The subframe pattern for backhaul downlink reception on the first downlink CC may be a 10 ms-period pattern or a 40 ms-period pattern in subframes other than subframes in which configuration of MBSFN subframes are restricted.

It is to be understood that both the foregoing general description and the following detailed description of the present invention are exemplary and explanatory and are intended to provide further explanation of the invention as claimed.

Advantageous Effects

According to the present invention, multiple carriers can be efficiently configured for and assigned to a backhaul link and an access link and the backhaul link can be efficiently multiplexed with the access link. In addition, transmission and reception collision between the backhaul link and the access link can be prevented during a transmission feedback operation.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

Figure 1:
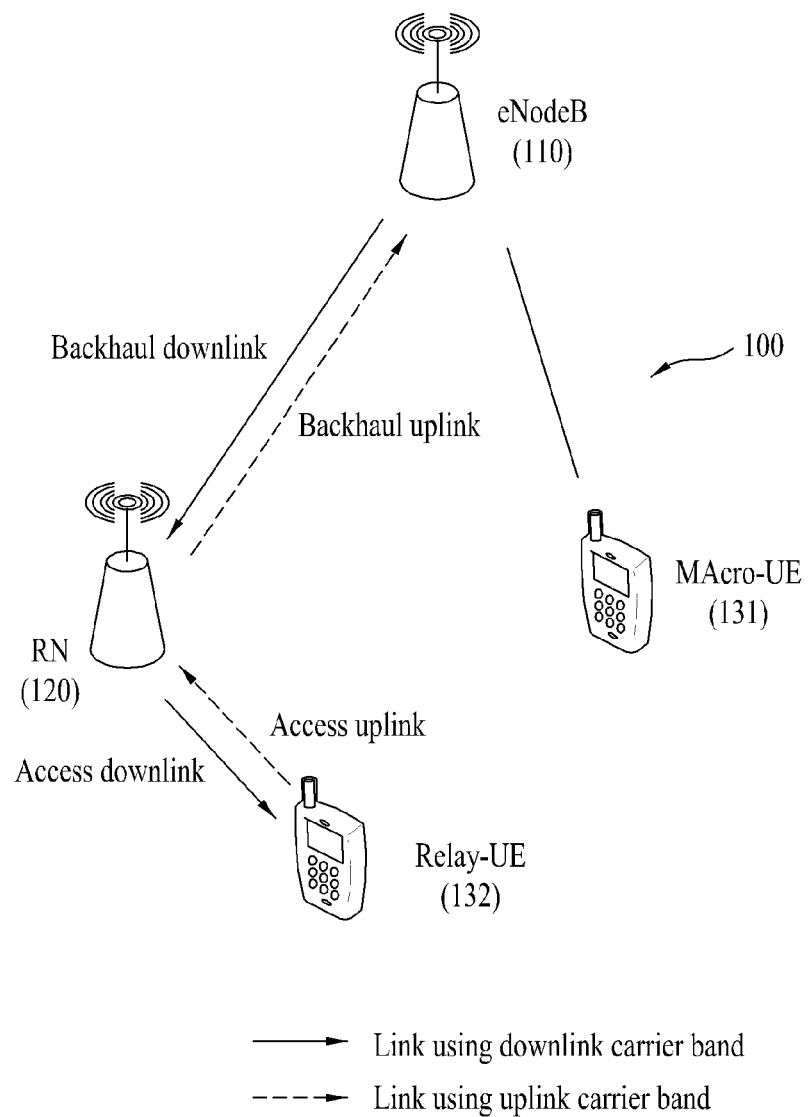
FIG. 1 illustrates a wireless communication system including an evolved Node B (eNode B), a Relay Node (RN), and User Equipments (UEs)

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). A BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)', 'Relay Station (RS)', etc. In addition, the term 'terminal' may be replaced with the term 'UE', 'Mobile Station (MS)', 'Mobile Subscriber Station (MSS)', 'Subscriber Station (SS)', etc.

Specific terms described in the following description are given to help the understanding of the present invention and can be replaced with other terms within the scope and spirit of the present invention.

In some instances, known structures and devices are omitted or are shown in block diagram form, focusing on important features of the structures and devices, so as not to obscure the concept of the present invention. The same reference numerals will be used throughout this specification to refer to the same or like parts.

The embodiments of the present invention can be supported by standard documents disclosed for at least one of wireless access systems, that is, an Institute of Electrical and Electronics Engineers (IEEE) 802 system, a 3$^{rd}$ Generation Partnership Project (3GPP) system, a 3GPP Long Term Evolution (LTE) system, an LTE-Advanced (LTE-A) system, and a 3GPP2 system. That is, steps or parts that are not described in order to clarify the subject matter of the present invention can be supported by the above documents. Further, all terms described in this specification can be explained by the standard documents.

The embodiments of the present invention are applicable to a variety of wireless access systems such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as IEEE 802.11 (Wireless Fidelity (Wi-Fi)), IEEE 802.16 (Worldwide interoperability for Microwave Access (WiMAX)), IEEE 802-20, Evolved UTRA (E-UTRA), etc. UTRA is a part of Universal Mobile Telecommunications System (UMTS). 3GPP LTE is a part of Evolved UMTS (E-UMTS) using E-UTRA, employing OFDMA for downlink and SC-FDMA for uplink. LTE-A is an evolution of 3GPP LTE. WiMAX can be described by the IEEE 802.16e standard (WirelessMAN-OFDMA Reference System) and the advanced IEEE 802.16m standard (WirelessMAN-OFDMA Advanced System). While the following description is given centering on the 3GPP LTE and 3GPP LTE-A systems for clarity, it should be understood that the present invention is not limited to the specific systems.

Figure 2:
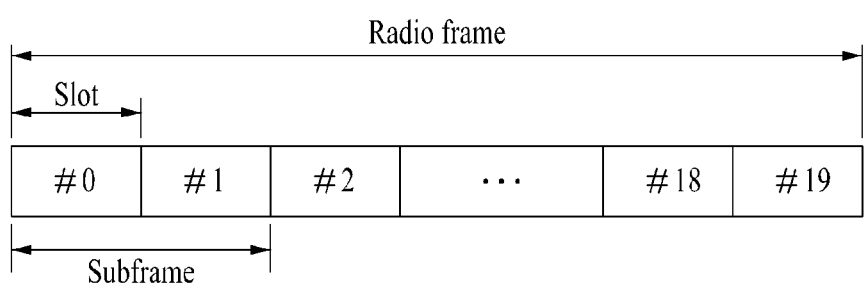
FIG. 2 illustrates the structure of a radio frame in a $3^{rd}$ Generation Partnership Project (3GPP) Long Term Evolution (LTE) system.

FIG. 2 illustrates a radio frame structure in the 3GPP LTE system. One radio frame is divided into 10 subframes, each subframe including two slots in the time domain. The transmission time of one subframe is defined as a Transmission Time Interval (TTI). For example, one subframe may be 1 ms long and one slot may be 0.5 ms long. One slot may include a plurality of Orthogonal Frequency Division Multiplexing (OFDM) symbols in the time domain. Because the 3GPP LTE system uses OFDMA for downlink, an OFDM symbol represents one symbol period. One symbol may be called an SC-FDMA symbol or symbol period for uplink. A Resource Block (RB) is a resource allocation unit including a plurality of contiguous subcarriers in one slot. This radio frame structure is purely exemplary and thus the number of subframes in a radio frame, the number of slots in a subframe, or the number of OFDM symbols in a slot may vary.

Figure 3:
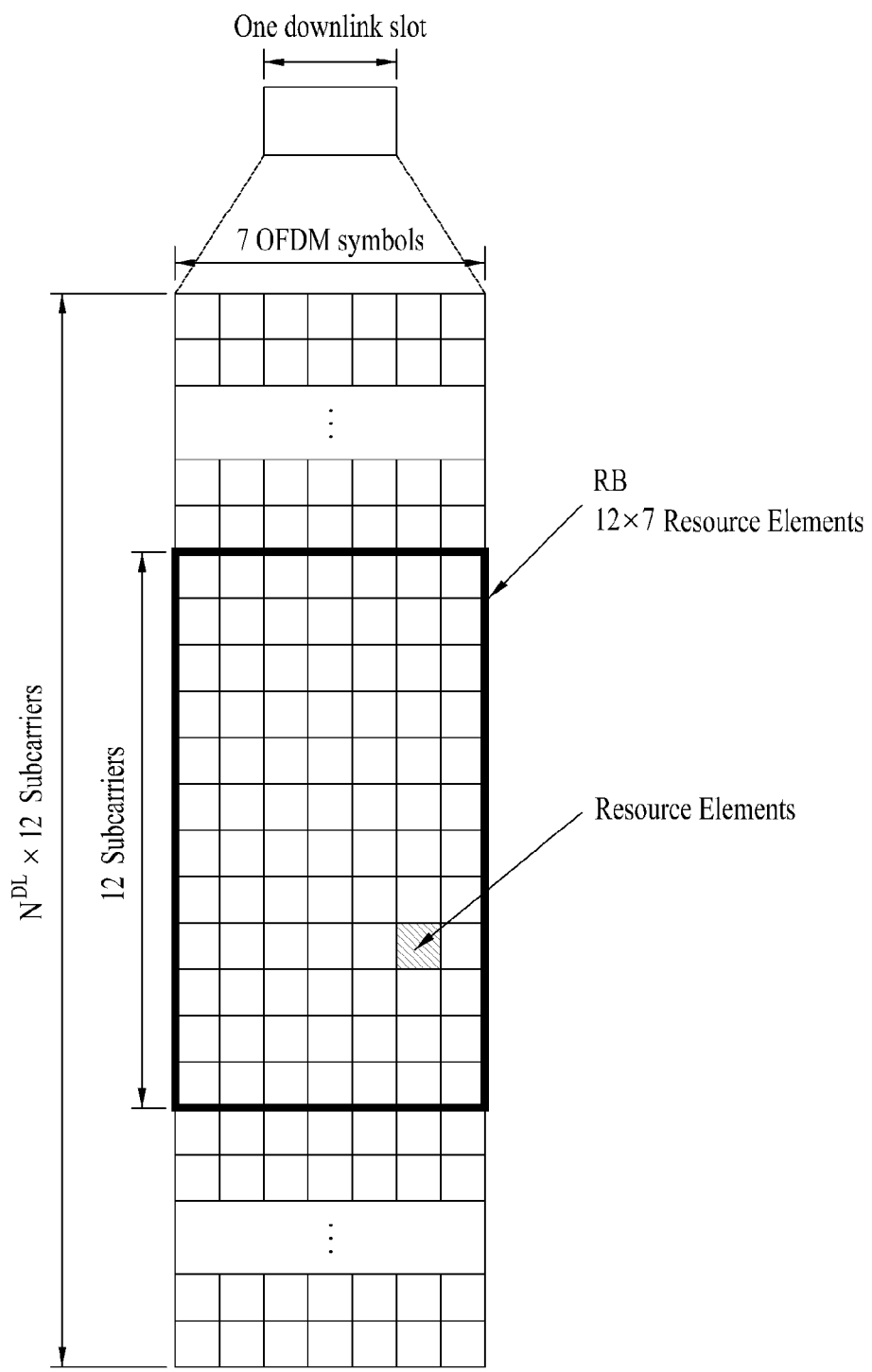
FIG. 3 illustrates a resource grid in a downlink slot.

FIG. 3 illustrates the structure of a downlink resource grid for the duration of one downlink slot. One downlink slot includes 7 OFDM symbols in the time domain and one RB has 12 subcarriers in the frequency domain, to which the present invention is not limited. For example, although one slot includes 7 OFDM symbols in case of a normal Cyclic Prefix (CP), one slot may include 6 OFDM symbols in case of an extended CP. Each element on the resource grid is called a resource element. One RB includes 12×7 resource elements. The number of RBs per downlink slot, $N^{DL}$ depends on a downlink transmission bandwidth. An uplink slot may have the same structure as a downlink slot.

Figure 4:
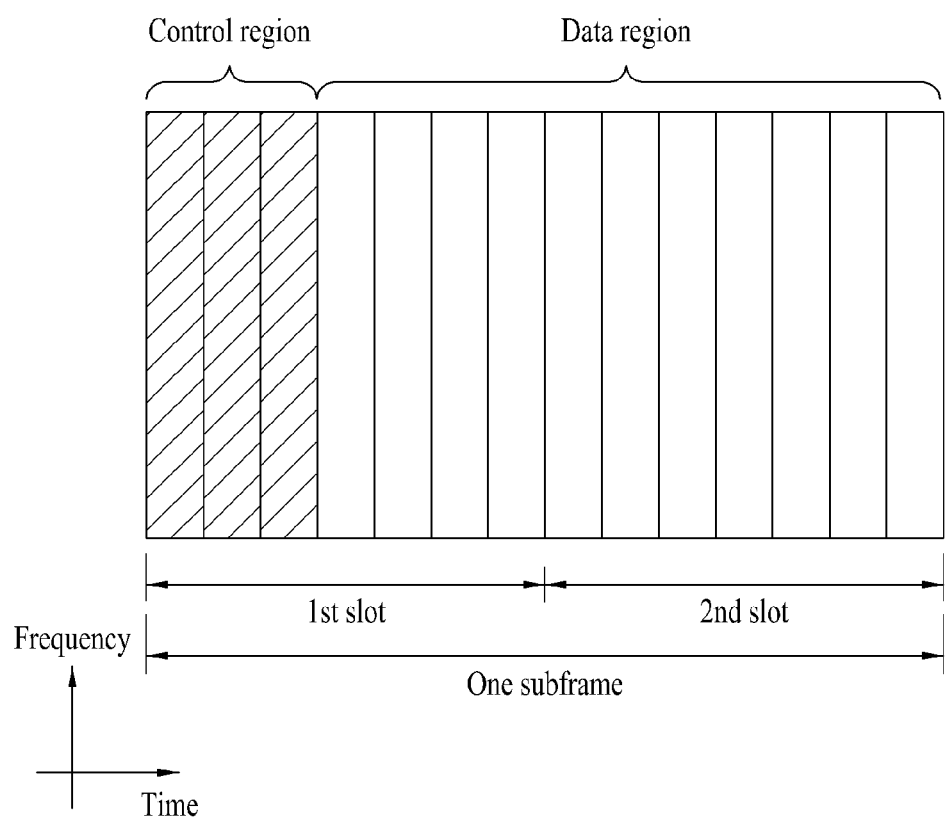
FIG. 4 illustrates the structure of a downlink subframe.

FIG. 4 illustrates a downlink subframe structure. Up to 3 OFDM symbols at the start of the first slot of a subframe are used for a control region to which control channels are allocated and the other OFDM symbols of the subframe are used for a data region to which a Physical Downlink Shared Channel (PDSCH) is allocated. In the 3GPP LTE system, downlink control channels include, for example, a Physical Control Format Indicator CHannel (PCFICH), a Physical Downlink Control CHannel (PDCCH), and a Physical Hybrid automatic repeat request Indicator CHannel (PHICH). The PCFICH is transmitted in the first OFDM symbol of a subframe, carrying information about the number of OFDM symbols used for transmitting control channels in the subframe. The PHICH includes an HARQ ACKnowledgment/Negative ACKnowledgment (ACK/NACK) signal as a response to an uplink transmission. Control information carried on the PDCCH is called Downlink Control Information (DCI). The DCI includes uplink or downlink scheduling information or uplink transmission power control commands for a UE group. The PDCCH may deliver information about resource allocation and a transmission format of a Downlink Shared Channel (DL-SCH), information about resource allocation of an Uplink Shared Channel (UL-SCH), paging information of a Paging Channel (PCH), system information on the DL-SCH, information about resource allocation to a higher-layer control message such as a Random Access Response transmitted on a PDSCH, a set of transmission power control commands for the individual UEs of a UE group, transmission power control information, and Voice over IP (VoIP) activation information. A plurality of PDCCHs may be transmitted in the control region. A UE may monitor a plurality of PDCCHs. A PDCCH is transmitted in a combination of one or more contiguous Control Channel Elements (CCEs). A CCE is a logical allocation unit used to provide a PDCCH at a coding rate based on a radio channel state. A CCE corresponds to a plurality of resource element groups. The format of a PDCCH and the number of available bits for the PDCCH are determined according to the relationship between the number of CCEs and a coding rate provided by the CCEs. An eNode B determines a PDCCH format according to DCI transmitted to a UE and attaches a Cyclic Redundancy Check (CRC) to the control information. The CRC is masked by an Identifier (ID) called a Radio Network Temporary Identifier (RNTI) according to the owner or usage of the PDCCH. If the PDCCH is for a specific UE, the CRC may be masked by the Cell-RNTI (C-RNTI) of the UE. If the PDCCH is for a paging message, the CRC may be masked by a Paging Indicator Identifier (P-RNTI). If the PDCCH is for system information (specifically, a System Information Block (SIB)), the CRC may be masked by a system information ID and a System Information RNTI (SI-RNTI). To indicate a Random Access Response for a Random Access Preamble transmitted from a UE, the CRC of the PDCCH may be masked by a Random Access-RNTI (RA-RNTI).

Figure 5:
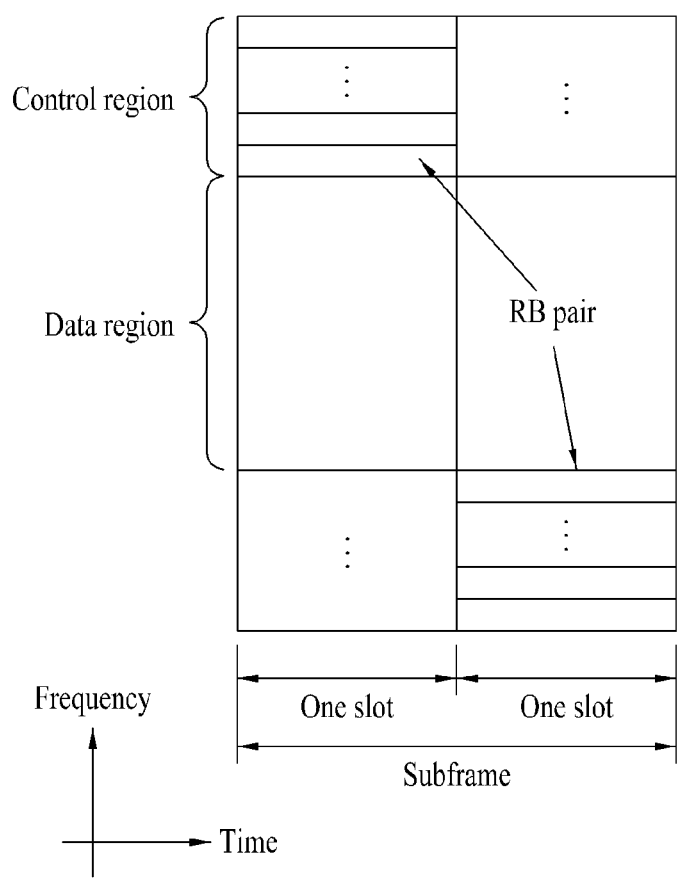
FIG. 5 illustrates the structure of an uplink subframe.

FIG. 5 illustrates an uplink subframe structure. An uplink subframe may be divided into a control region and a data region in the frequency domain. A Physical Uplink Control Channel (PUCCH) is allocated to the control region, carrying uplink control information. A Physical Uplink Shared Channel (PUSCH) is allocated to the data region, carrying user data. To maintain single-carrier characteristics, a UE does not transmit a PUCCH and a PUSCH at the same time. The PUCCH of the UE is allocated to an RB pair in a subframe. The RBs of the RB pair occupy different subcarriers in two slots. Thus it is said that the RB pair allocated to the PUCCH is frequency-hopped over a slot boundary.

Relay Configuration

Referring to FIG. 1 again, the RN 120 forwards transmission and reception between the eNode B 110 and the UE 131 and two types of links having different characteristics (a backhaul link and an access link) are applied to each carrier frequency band. If the backhaul link between the eNode B 110 and the RN 120 uses a downlink frequency band or downlink subframe resources, it may be referred to as a backhaul downlink and if the backhaul link uses an uplink frequency band or uplink subframe resources, it may be referred to as a backhaul uplink. Herein, a frequency band is resources allocated in Frequency Division Duplex (FDD) mode and a subframe is resources allocated in Time Division Duplex (TDD) mode. Likewise, if the access link between the RN 120 and the UE(s) 131 uses a downlink frequency band or downlink subframe resources, it may be referred to as an access downlink and if the access link uses an uplink frequency band or uplink subframe resources, it may be referred to as an access uplink. In the illustrated case of FIG. 1, an FDD-RN backhaul uplink/downlink and an FDD-RN access uplink/downlink are configured.

An eNode B is required to perform uplink reception and downlink transmission and a UE is required to perform uplink transmission and downlink reception. Meanwhile, all of backhaul uplink transmission to an eNode B, access uplink reception from a UE, backhaul downlink reception from the eNode B, and access downlink transmission to the UE are required for an RN. That is, the RN is required to perform both transmission and reception on each of the downlink and the uplink as illustrated in Table 1 below.

TABLE 1

| Function | eNode B | RN | UE |
| --- | --- | --- | --- |
| Downlink transmission | ○ | ○ | X |
| Downlink reception | X | ○ | ○ |

TABLE 1-continued

| Function | eNode B | RN | UE |
| --- | --- | --- | --- |
| Uplink transmission | X | ○ | ○ |
| Uplink reception | ○ | ○ | X |

Figure 6:
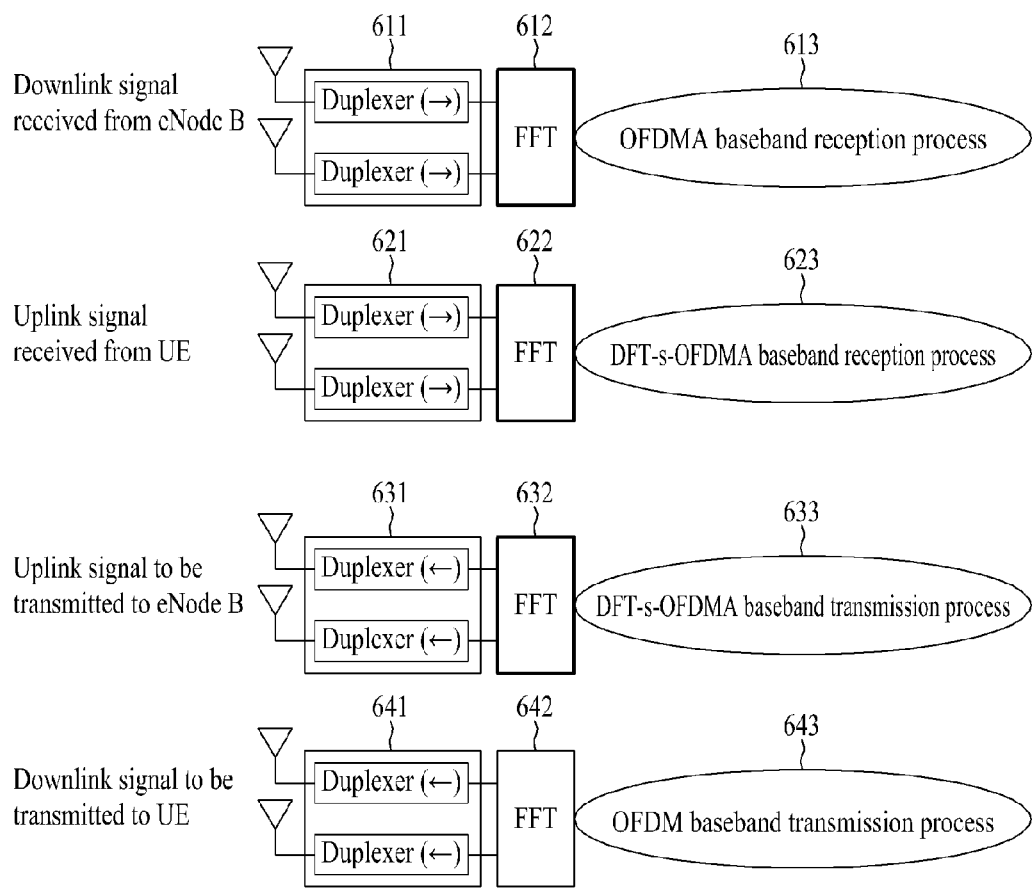
FIG. 6 illustrates an example of implementing transmission/reception functions in a Frequency Division Duplex (FDD) RN.

FIG. 6 illustrates an example of implementing transmission/reception functions in an FDD RN. The conceptual reception function of the RN will be described below. A downlink signal received from an eNode B is provided to a Fast Fourier Transform (FFT) module 612 through a duplexer 611. Then an OFDMA baseband reception process 613 is performed on the downlink signal. An uplink signal received from a UE is provided to an FFT module 622 through a duplexer 621. Then a Discrete Fourier Transform-spread-OFDMA (DFT-s-OFDMA) baseband reception process 623 is performed on the uplink signal. The downlink signal reception process from the eNode B and the uplink signal reception process from the UE may be performed in parallel at the same time. Meanwhile, the conceptual transmission function of the RN will be described. An uplink signal is subjected to a DFT-s-OFDMA baseband transmission process 633 and then transmitted to the eNode B through an Inverse FFT (IFFT) module 632 and a duplexer 631. A downlink signal is subjected to an OFDMA baseband transmission process 643 and then transmitted to the UE through an IFFT module 642 and a duplexer 641. The uplink signal transmission process to the eNode B and the downlink signal transmission process to the UE may be performed in parallel at the same time. In addition, single-directional duplexers may be realized using one bi-directional duplexer. For example, the duplexers 611 and 631 may be integrated into one bi-directional duplexer and the duplexers 621 and 641 may be integrated into one bi-directional duplexer. In case of a bi-directional duplexer, it may be configured so as to be branched into an IFFT module line and a baseband process module line in relation to transmission and reception in a specific carrier frequency band.

'In-band' refers to operation of the backhaul link in the same frequency band as the access link, whereas 'out-band' refers to operation of the backhaul link in a different frequency band from the access link. For example, when an in-band RN performs backhaul downlink reception from an eNode B and access downlink transmission to a UE at the same time in a specific frequency band, the transmission signal from the transmitter of the in-band RN may be introduced into the receiver of the in-band RN. As a result, signal interference or RF jamming may occur to the RF front-end of the in-band RN. Similarly, simultaneous occurrence of backhaul uplink transmission to the eNode B and access uplink reception from the UE in a specific frequency band may cause signal interference at the RF front-end of the in-band RN. To avoid the signal interference, the RN may be configured so as not to simultaneously perform transmission and reception in the same frequency band. For example, the RN may multiplex backhaul downlink transmission with access downlink transmission in Time Division Multiplexing (TDM) by repeatedly receiving a signal on the backhaul downlink for a predetermined time period and transmitting a signal on the access downlink for a different time period, in a specific frequency band. Similarly, the RN may use the TDM scheme between backhaul uplink transmission and access uplink transmission.

Carrier Aggregation

Carrier Aggregation (CA) (or multi-carrier) is a technology that enables signal exchange in a group of one or more Component Carriers (CCs) during a TTI. In downlink CA, an eNode B supports downlink transmission using frequency resources (subcarriers or Physical Resource Blocks (PRBs)) of one or more carrier bands in given time resources (in units of a subframe). Similarly, in uplink CA, a UE supports uplink transmission using frequency resources (subcarriers or PRBs) of one or more carrier bands in given time resources (in units of a subframe). While the following description is given in the context of the uplink/downlink between an eNode B and a UE by way of example, the same thing is applicable to the backhaul uplink/downlink between a donor eNode B and an RN and the access uplink/downlink between an RN and a UE.

Figure 7:
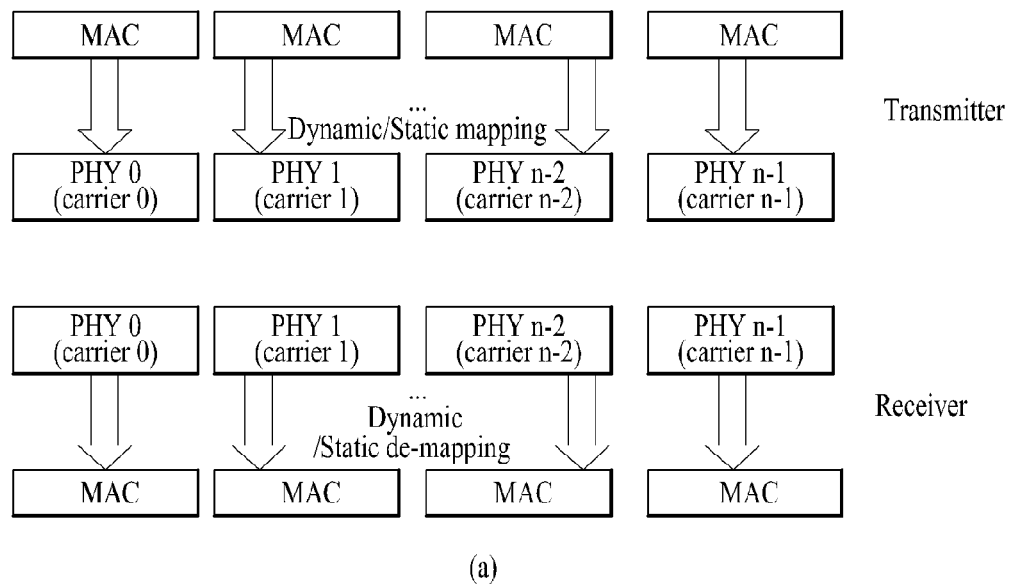
FIG. 7 illustrates the structures of a physical (PHY) layer and a Medium Access Control (MAC) layer in a multi-carrier system.
Figure 7:
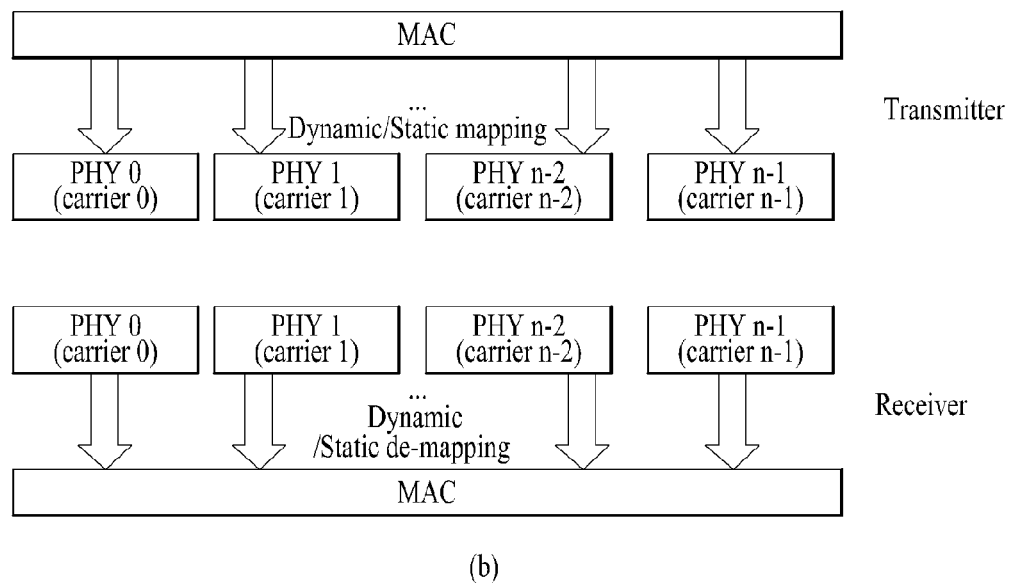

With reference to FIG. 7, the structures of the PHYsical (PHY) layer (Layer 1, L1) and the Medium Access Control (MAC) layer (Layer 2, L2) in a multi-carrier system will be described below. In a legacy single-carrier wireless communication system, an eNode B may have one PHY entity that supports one carrier and one MAC entity that controls the PHY entity. For example, the PHY layer may perform a baseband processing operation. The MAC layer may generate a MAC Protocol Data Unit (PDU) and perform an L1/L2 scheduler operation covering a MAC/RLC sublayer, for example, at a transmitter. A MAC PDU packet block of the MAC layer is converted to a transport block at a logical transport layer and then mapped to an input information block of the PHY layer.

Meanwhile, there may be a plurality of MAC-PHY entities in a multi-carrier system. That is, a transmitter and a receiver may be configured in such a manner that MAC-PHY entities are mapped to n CCs in a one-to-one correspondence, as illustrated in FIG. 7a. Because independent PHY and MAC layers are configured for each CC, a PDSCH is generated from a MAC PDU on a CC basis at the PHY layer.

Alternatively, one common MAC entity and a plurality of PHY entities may be configured in the multi-carrier system. That is, as illustrated in FIG. 7b, a transmitter and a receiver may be configured in the multi-carrier system in such a manner that n PHY entities are mapped to n CCs in a one-to-one correspondence and a single common MAC entity controls the n PHY entities. In this case, a MAC PDU of the single MAC layer may be branched into a plurality of transport blocks one to one corresponding to a plurality of CCs at the transport layer. Or when the MAC layer or the RLC layer generates a MAC PDU or an RLC PDU, the MAC PDU or the RLC PDU may be branched for the respective CCs. Consequently, a PDSCH is generated for each CC at the PHY layer.

A PDCCH carrying control information of L1/L2 control signaling generated from the packet scheduler of the MAC layer may be mapped to and transmitted in physical resources for each individual CC. PDCCHs carrying control information for transmission of a PDSCH to a specific UE or for transmission of a PUSCH from the specific UE (channel assignment PDCCHs or DL/UL grant PDCCHs) may be encoded separately for respective CCs each carrying a PDSCH/PUSCH. These PDCCHs may be referred to as separately coded PDCCHs. Meanwhile, control information for PDSCH/PUSCH transmission on a plurality of CCs may be configured into a single PDCCH, for transmission. This PDCCH may be referred to as a jointly coded PDCCH.

To support CA, a connection needs to be established or a connection setup needs to be prepared for between an eNode B and a UE (or an RN) in order to transmit a control channel (PDCCH or PUCCH) and/or a shared channel (PDSCH or PUSCH). For the connection/connection setup, a specific UE (or RN) needs to measure carriers and/or report the carrier measurements and thus CCs to be measured and/or reported may be assigned to the UE (or RN). That is, CC assignment is the process of configuring CCs (setting the number and indexes of CCs) for use in downlink/uplink transmission to/from a specific UE (or RN) from among downlink/uplink CCs configured by an eNode B, taking into account the capability of the specific UE (or RN) and a system environment.

If the Radio Resource Management (RRM) layer at L3 controls CC assignment, the CC assignment may be signaled by UE-specific, RN-specific, cell-specific, or cell cluster-specific RRC signaling. When CC assignment needs to be controlled dynamically, the CC assignment may be signaled by L1/L2 control signaling on a specific PDCCH, a dedicated physical control channel, or a PDSCH taking the form of an L2 MAC message. Meanwhile, if the packet scheduler controls CC assignment, the CC assignment may be signaled the CC assignment may be signaled by L1/L2 control signaling on a specific PDCCH, a dedicated physical control channel, or a PDSCH taking the form of an L2 MAC message.

As described above, as an RN is introduced to forward transmission and reception between an eNode B and a UE, a backhaul link and an access link are defined in downlink resources (a downlink carrier frequency band or subframe) and uplink resources (an uplink carrier frequency band or subframe). A multi-carrier technique may be used according to a transmission rate that is required for the channel state and traffic Quality of Service (QoS) of the backhaul link and access link. Now a detailed description will be given of CC configuration on the backhaul link and the access link. In the following description, higher-layer signaling may be, for example, RRC signaling and L1/L2 signaling may be performed, for example, through a specific PDCCH, a dedicated physical control channel, or a PDSCH taking the form of an L2 MAC message.

Backhaul Link CC Assignment

CC assignment for a backhaul downlink and/or a backhaul uplink between an eNode B and an RN will be described below.

Method 1

A downlink and/or uplink CC may be configured (assigned) RN-specifically. For this purpose, a cell (or eNode B) having a backhaul link established with an RN may signal CC allocation information to the RN by RN-specific higher-layer signaling (i.e. RRC signaling) or RN-specific L1/L2 control signaling (i.e. on a PDCCH, a dedicated physical control channel, or a PDSCH taking the form of an L2 MAC message).

Method 2

Downlink and/or uplink CCs may be configured (assigned) commonly to RNs within a cell (or eNode B) or a cell cluster. For this purpose, the cell (or eNode B) may signal CC allocation information to the RNs by cell-specific (or cell cluster-specific) higher-layer signaling (i.e. RRC signaling) or cell-specific (or cell cluster-specific) L1/L2 control signaling (i.e. on a PDCCH, a dedicated physical control channel, or a PDSCH taking the form of an L2 MAC message). If it is not easy to configure a physical channel on the backhaul downlink, for cell-specific RRC signaling or cell-specific L1/L2 control signaling, the common CC allocation control information may be signaled to the individual RNs by RN-specific higher-layer signaling (i.e. RRC signaling) or RN-specific L1/L2 control signaling (i.e. on a PDCCH, a dedicated physical control channel, or a PDSCH taking the form of an L2 MAC message).

Method 3

RNs located within a cell (or eNode B) or a cell cluster are grouped into a plurality of RN groups and downlink and/or uplink CCs may be configured (assigned) on an RN group basis. For this purpose, CCs may be configured implicitly using group-specific common information without additional signaling. Or CC allocation control information about an RN group may be signaled to the individual RNs of the RN group by RN-specific higher-layer signaling (i.e. RRC signaling) or RN-specific L1/L2 control signaling (i.e. on a PDCCH, a dedicated physical control channel, or a PDSCH taking the form of an L2 MAC message). If an RN group-specific signaling channel is used for the RN group, the CC allocation information may be signaled to the RN group by RN group-specific higher-layer signaling (i.e. RRC signaling) or RN group-specific L1/L2 control signaling (i.e. on a PDCCH, a dedicated physical channel, or a PDSCH taking the form of an L2 MAC message).

Backhaul Link Primary CC Assignment

Before describing backhaul link primary CC assignment, the definition of a primary CC will first be described.

A downlink primary CC defined on the backhaul link of an RN is basically any cell-specific CC (which carries RN-common control signaling from an eNode B to RNs, that is, on which the RNs expect reception of control signaling from the eNode B). Cell-specific, RN-common control signaling may refer to transmission of control information common to RNs within a cell or system information on a PDCCH that the RNs can commonly receive, on a PDSCH taking the form of an L2 MAC message, or on a PDSCH as higher-layer signaling (i.e. RRC signaling). Meanwhile, the backhaul link primary CC may be extended to mean a CC carrying RN-specific control signaling as well as cell-specific (RN-common) control signaling. The RN-specific control signaling may be a DL channel assignment PDCCH associated with PDSCH transmission on the entire backhaul downlink CCs and a UL grant PDCCH associated with PUSCH transmission on the entire backhaul uplink CCs. The RN-specific control signaling may also refer to transmission of RN-specific higher-layer (i.e. RRC) control information or control information as an L2 MAC message to an individual RN. Herein, CC allocation information for backhaul downlink or uplink transmission and/or backhaul link primary CC allocation information may be signaled.

A primary CC may also be called a primary cell. CCs that can be allocated in addition to the primary CC may be called secondary CCs or secondary cells.

If a plurality of CCs are allocated to a UE or an RN, a DL channel assignment or UL grant associated with the other CCs may be transmitted on a downlink primary CC of the extended meaning. That is, cross-carrier scheduling may be performed by defining a Carrier Indicator Field (CIF) for a specific CC in the DCI formats of a DL channel assignment PDCCH and a UL grant PDCCH that are transmitted on the downlink primary CC. If cross-carrier scheduling is not activated and a plurality of CCs are allocated to a UE or an RN, the CIF field may not be defined in the DCI formats of a DL channel assignment PDCCH and a UL grant PDCCH directed to the UE or the RN and the downlink primary CC may carry a DL channel assignment PDCCH associated with PDSCH transmission on the same downlink primary CC or a UL grant PDCCH associated with PUSCH transmission on an uplink CC linked to the downlink primary CC or on an uplink primary CC.

An uplink primary CC defined on the backhaul uplink of the RN may be an uplink CC carrying a Channel Quality Indicator (CQI), Precoding Matrix Index (PMI), Rank Indicator (RI), or Channel Status Information (CSI) feedback in terms of Uplink Control Information (UCI) transmission. Alternatively or additionally to the above-described meaning of the uplink primary CC, if a Scheduling Request (SR) is defined for an RN, the uplink primary CC may refer to an uplink CC carrying the SR. Alternatively or additionally to the above-described meaning of the uplink primary CC, the uplink primary CC may be an uplink CC carrying an uplink ACK/NACK feedback for a downlink PDSCH transmission.

The uplink primary CC defined on the backhaul uplink of the RN may be configured implicitly as an uplink CC linked to the downlink primary CC according to a downlink-uplink linkage. Or the uplink primary CC may be configured by cell-specific or RN-specific higher-layer signaling or L1/L2 control signaling (e.g. on an LTE Rel-8 PDCCH).

The following description is given of methods for assigning a primary CC to a backhaul downlink and/or a backhaul uplink between an eNode B and an RN.

Method 1

An eNode B may allocate one or more downlink CCs and/or uplink CCs as primary CCs to each RN, RN-specifically and/or RN-independently. The primary CCs may be configured implicitly based on already shared information such as a physical cell ID or a physical RN ID without additional signaling. Meanwhile, primary CC allocation information may be signaled to the individual RN by RN-specific higher-layer signaling (i.e. RRC signaling) or RN-specific L1/L2 control signaling (on a PDCCH, a dedicated physical control channel, or a PDSCH in the form of an L2 MAC message).

Method 2

One or more downlink and/or uplink CCs may be configured as primary CCs commonly to RNs within a cell (eNode B) or a cell cluster. The primary CCs may be configured implicitly based on common control information or system control information within the cell (eNode B) or the cell cluster without additional signaling. Meanwhile, primary CC allocation information may be signaled to the RNs by cell-specific higher-layer signaling or cell-specific L1/L2 control signaling. If it is not easy to configure an appropriate channel on the backhaul downlink, for cell-specific higher-layer signaling or cell-specific L1/L2 control signaling, the common backhaul downlink and/or backhaul uplink primary CC allocation information may be signaled to the individual RNs within the cell by RN-specific higher-layer signaling or RN-specific L1/L2 control signaling.

Method 3

RNs located within a cell (or eNode B) or a cell cluster are grouped into a plurality of RN groups and common downlink and/or uplink CCs may be configured as primary CCs on an RN group basis. The primary CCs may be configured implicitly for an RN group based on common information specific to the RN group without additional signaling. Meanwhile, the primary CC configuration information may be signaled to the individual RNs by RN-specific higher-layer signaling or RN-specific L1/L2 control signaling. If an RN group-specific signaling channel is used for the RN group, the backhaul downlink and/or backhaul uplink primary CC configuration information may be signaled to the RN group by RN group-specific higher-layer signaling or RN group-specific L1/L2 control signaling.

Access Link CC Assignment

A description will be given of assigning CCs to an access link in relation to CC allocation to a backhaul link, based on assignment of backhaul link CCs and backhaul link primary CCs according to the foregoing various methods.

Method 1

An RN may configure or allocate access downlink and/or uplink CCs in such a manner that the access downlink and/or uplink CCs are identical to backhaul downlink and/or uplink CCs configured for a cell or eNode B to which the RN belongs, for each RN, or for each RN group, or the access downlink and/or uplink CCs are a specific subset of the backhaul downlink and/or uplink CCs. Access downlink and/or uplink CC allocation information may be signaled to UEs connected to the RN by RN-specific (i.e. UE-common) higher-layer signaling (i.e. RRC signaling) or RN-specific L1/L2 control signaling (on a PDCCH, a dedicated physical control channel, or a PDSCH in the form of an L2 MAC message).

Or, the RN may configure access downlink and/or uplink CCs for each UE with which the RN has established a transmission connection in such a manner that the access downlink and/or uplink CCs for the UE are identical to the CCs configured for the backhaul downlink and/or uplink or the access downlink and/or uplink CCs for the UE are a specific subset of the backhaul downlink and/or uplink CCs. Access downlink and/or uplink CC allocation information may be signaled to the UE by UE-specific higher-layer signaling (i.e. RRC signaling) or UE-specific L1/L2 control signaling (on a PDCCH, a dedicated physical control channel, or a PDSCH in the form of an L2 MAC message).

The primary CCs configured for the backhaul downlink and/or uplink or a subset of the primary CCs configured for the backhaul downlink and/or uplink may be configured as primary CCs for the access downlink and/or uplink. If the primary CC configuration of the access downlink and/or uplink is applied commonly to UEs within the RN, access downlink and/or uplink primary CC configuration information may be signaled to the UEs by RN-specific (UE-common) higher-layer signaling or L1/L2 control signal. If access downlink and/or uplink primary CCs are configured for each individual UE, access downlink and/or uplink primary CC configuration information may be signaled to the UE by UE-specific higher-layer signaling or L1/L2 control signaling.

Method 2

Independently of downlink and/or uplink CCs that an eNode B has configured for an RN, access downlink and/or uplink CCs may be allocated RN-specifically (or UE-specifically) from among downlink and/or uplink CCs available to the RN.

In case of RN-specific access link CC allocation, access downlink and/or uplink CC allocation information may be signaled to UEs by RN-specific (UE-common) higher-layer signaling (i.e. RRC signaling) or L1/L2 control signaling (on a PDCCH, a dedicated physical control channel, or a PDSCH in the form of an L2 MAC message). On the other hand, access downlink and/or uplink CCs may be configured (assigned) UE-specifically for an individual UE connected to the RN. In this case, access downlink and/or uplink CC allocation information may be signaled to the individual UE by UE-specific higher-layer signaling or L1/L2 control signaling.

Because access link CC configuration is independent of backhaul link CC configuration in Method 2, the number and indexes (frequency-domain positions) of CCs allocated to the access link may be different from the number and indexes of CCs allocated to the backhaul link. In this case, the backhaul link and the access link may be configured with perfectly different CCs in a downlink or uplink carrier band. Configuration of a backhaul downlink and/or uplink and an access downlink and/or uplink with different CCs may serve the purpose of eliminating the constraint of additional physical channel designing (i.e. R-PDCCH and R-PDSCH designing) caused by TDM-based resource partitioning between the backhaul link and the access link. On the other hand, it may be required that the access link CCs are partially identical to the backhaul link CCs to support the later-described TDM, Frequency Division Multiplexing (FDM), or TDM/FDM resource partitioning between the backhaul link and the access link for the purpose of effective control of total radio transmission resources including CA between the backhaul link and the access link and effective signaling of associated information. Therefore, Method 2 further includes designating P (P≥1) downlink CCs and/or Q (Q≥1) uplink CCs as default CCs so that at least these same default CCs may be allocated commonly to the backhaul link and the access link.

Meanwhile, the default CCs may be wholly or partially allocated as primary CCs of the backhaul downlink and/or uplink. Likewise, the default CCs may be wholly or partially allocated as primary CCs of the access downlink and/or uplink. The RN may configure the primary CCs of the access link independently of the primary CCs of the backhaul link by signaling to UEs. Therefore, the primary CC configuration of the access link may be same as or different from that of the backhaul link, which will be described later in greater detail.

If the primary CC configuration is applied commonly to UEs within the RN, control information about the primary CC configuration may be signaled to the UEs by RN-specific (UE-common) higher-layer signaling or RN-specific (UE-common) L1/L2 control signaling. Alternatively, if a primary CC is configured for each individual UE, control information about the primary CC configuration may be signaled to the UE by UE-specific higher-layer signaling or UE-specific L1/L2 control signaling.

Method 3

CCs different from CCs allocated to a backhaul downlink and/or uplink by an eNode B may be allocated to an access downlink and/or uplink.

The entire access link CCs may be different from the backhaul link CCs. To support the later-described TDM, FDM, or TDM/FDM resource partitioning between the backhaul link and the access link, it may be required that the access link CCs are only partially different from the backhaul link CCs. Accordingly, the backhaul link and the access link may differ in S (S≥1) CCs on the downlink and in T (T≥1) CCs on the uplink. In the case where a single CC is configured or assigned to each of the backhaul downlink and/or uplink and the access downlink and/or uplink, the CCs are different between the backhaul link and the access link in Method 3.

Access Link Primary CC Assignment

A primary CC defined on an access downlink is basically a CC that carries all RN-specific (UE-common) control signaling from an RN B to UEs (on which the UEs expect reception of control signaling from the RN). Meanwhile, the access downlink primary CC may be extended to mean a CC carrying UE-specific control signaling as well as RN-specific (UE-common) control signaling. The RN-specific (UE-common) control signaling may refer to transmission of UE-common control information or system information on a PDCCH that the UE can commonly receive, a PDSCH in the form of an L2 MAC message, or on a PDSCH as higher-layer signaling (i.e. RRC signaling). The UE-specific control signaling may be a DL channel assignment PDCCH associated with PDSCH transmission on the entire access downlink CCs and a UL grant PDCCH associated with PUSCH transmission on the entire access uplink CCs. The UE-specific control signaling may also refer to transmission of UE-specific higher-layer (i.e. RRC) control information or control information in the form of an L2 MAC message to an individual RN. Herein, access downlink or uplink CC allocation and/or access link primary CC allocation information may be signaled.

If a plurality of CCs are allocated, a DL channel assignment or UL grant associated with the other CCs may be transmitted on a downlink primary CC in the extended meaning. That is, cross-carrier scheduling may be performed by defining a CIF for a specific CC in the DCI formats of a DL channel assignment PDCCH and a UL grant PDCCH that are transmitted on the downlink primary CC. If cross-carrier scheduling is not activated and a plurality of CCs are allocated to a UE, the CIF field may not be defined in the DCI formats of a DL channel assignment PDCCH and a UL grant PDCCH directed to the UE and the downlink primary CC may carry a DL channel assignment PDCCH associated with PDSCH transmission on the same downlink primary CC or a UL grant PDCCH associated with PUSCH transmission on an uplink CC linked to the downlink primary CC or on an uplink primary CC.

Meanwhile, an uplink primary CC defined on the access uplink of the RN may be an uplink CC carrying a CQI, PMI, RI, or CSI feedback in terms of UCI transmission. Alternatively or additionally to the above-described meaning of the uplink primary CC, if an SR is defined for a UE, the uplink primary CC may refer to an uplink CC carrying the SR. Alternatively or additionally to the above-described meaning of the uplink primary CC, the uplink primary CC may be an uplink CC carrying an uplink ACK/NACK feedback for a downlink PDSCH transmission.

An uplink CC linked to a downlink primary CC according to a downlink-uplink linkage may be implicitly set as the access uplink primary CC. Or the access uplink primary CC may be configured by RN-specific or UE-specific higher-layer signaling or L1/L2 control signaling (e.g. on an LTE Rel-8 PDCCH, a dedicated physical control channel, or a PDSCH in the form of an L2 MAC message).

Figure 8:
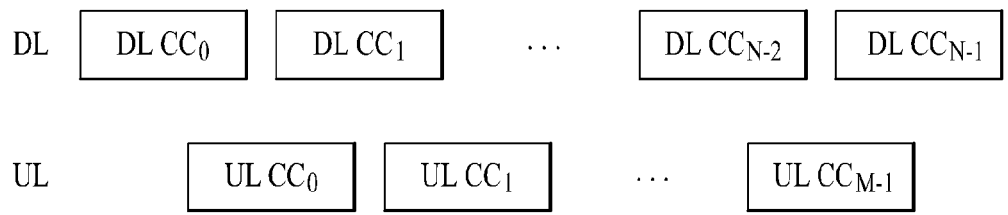
FIG. 8 illustrates a DownLink/UpLink (DL/UL) Component Carrier (CC) configuration.

FIG. 8 illustrates a downlink/uplink CC configuration. In FIG. 8, it is assumed that there are N downlink CCs and M uplink CCs.

In relation to Method 1 for configuring access link CCs, access downlink and/or uplink CCs may be allocated to an RN according to backhaul downlink and/or uplink CCs allocated to the RN by an eNode B. Herein, in addition to configuring access downlink and/or uplink CCs for the RN, the eNode B may allocate access downlink and/or uplink CCs to each UE or directly to each UE within the RN, by UE-specific higher-layer signaling (i.e. RRC signaling) or L1/L2 control signaling (i.e. on a PDCCH, a dedicated physical control channel, or a PDSCH in the form of an L2 MAC message). These scheme may be applied, taking into account the followings selectively.

(1) J (J=1, 2, ..., N) CCs selected from among N downlink CCs DL $CC_0$ to DL $CC_{N-1}$ configured for the backhaul downlink of the RN by the eNode B may be configured for the access downlink of the RN according to the capability of the RN.

(2) K (K=1, 2, ..., M) CCs selected from among M uplink CCs, UL $CC_0$ to UL $CC_{M-1}$ configured for the backhaul uplink of the RN may be configured for the access uplink of the RN according to the capability of the RN.

(3) During initial setup of the RN, the eNode B or the RN may configure CCs according to the capability of the RN.

(4) The eNode B (when the eNode B configures CCs) or an RN (when the RN directly configures CCs) may transmit CC configuration information to the RN by RN-specific higher-layer signaling (i.e. RRC signaling) or to the eNode B during the initial setup of the RN.

(5) J access downlink CCs may be identical to backhaul downlink CCs or may be a subset of the backhaul downlink CCs. K access uplink CCs may be identical to backhaul uplink CCs or may be a subset of the backhaul uplink CCs. Meanwhile, different CCs may be allocated to each UE within the coverage area of the RN, from among the J access downlink CCs and the K access uplink CCs. That is, the number and indexes of downlink and/or uplink CCs may be set for each UE independently. For this purpose, UE-specific higher-layer signaling (i.e. RRC signaling) or L1/L2 control signaling (on a PDCCH, a dedicated physical control channel, or a PDSCH in the form of an L2 MAC message) may be used. Total access downlink and/or uplink CCs may be configured for an RN by adding CCs to the whole set of or a subset of the J access downlink CCs and/or the K access uplink CCs.

(6) Unlike the above methods, at least one same downlink/uplink CC may be configured on both the backhaul link and the access link in allocating CCs to the backhaul and access downlinks and/or uplinks.

(7) Primary CCs of the access downlink and/or uplink may be the whole or part (i.e. a subset) of the primary CCs of the backhaul downlink and/or uplink. Meanwhile, the primary CCs of the access downlink and/or uplink may be a superset including the primary CCs of the backhaul downlink and/or uplink.

(8) The eNode B may configure CCs (including primary CCs) for the backhaul downlink and/or uplink of the RN, cell-specifically or RN-specifically. For the access downlink and/or access uplink of the RN, the RN may configure CCs RN-specifically or UE-specifically for each UE within the coverage area of the RN. The above CC and/or primary CC configuration may last permanently from the initial setup of the RN onward without additional signaling or may change semi-statically or dynamically. The CC configuration may be signaled to a receiver (i.e. the RN for the backhaul link and the UE for the access link) by cell-specific, RN-specific, or UE-specific higher-layer signaling (i.e. RRC signaling) or L1/L2 control signaling (on a PDCCH, a dedicated physical control channel, or a PDSCH in the form of an L2 MAC message).

(9) The RN may configure access downlink and/or uplink CCs based on the backhaul downlink and/or uplink CCs configured for the RN by the eNode B. According to the present invention, the access link CCs may be identical to the backhaul link CCs and downlink and/or uplink CCs may be configured commonly for UEs within the RN from among the configured downlink and/or uplink CCs. For this purpose, RN-specific higher-layer signaling or L1/L2 signaling may be used. Meanwhile, access downlink and/or uplink CCs may be configured for individual UEs within the coverage area of the RN from among the access downlink and/or uplink CCs identical to the backhaul downlink and/or uplink CCs. For this purpose, UE-specific higher-layer signaling or L1/L2 signaling may be used.

Unlike the above methods, the RN may configure access link CCs independently of the backhaul link CC configuration set by the eNode B. Specific methods for independently configuring access link CCs will be described below.

Method 1

When access downlink and/or uplink CCs are configured, the whole set or a subset of backhaul downlink and/or uplink CCs may form a part of the access link CCs and different CCs from the backhaul link CCs may additionally form the other part of the access link CCs. Herein, unique access link CCs may be configured for each individual UE within the coverage area of the RN.

The access downlink CC configuration of the RN involves configuring CCs by the RN or configuring CCs for a specific UE by the RN. To support interaction between the backhaul link and the access link, A (A=1, 2, ..., J−1) access downlink CCs selected from among J (J=1, 2, ..., N) access downlink CCs and B (B=1, 2, ..., K−1) access uplink CCs selected from among K (K=1, 2, ..., M) access uplink CCs may be identical to (may be overlapped with) the whole or part of the backhaul downlink or uplink CCs configured by the eNode B. The remaining (J−A) access downlink CCs and the remaining (K-B) access uplink CCs may be configured independently of the eNode B-configured backhaul downlink or uplink CCs. The independent CC configuration means configuring CCS such that the access link includes the same CCs as or different CCs from the backhaul link.

Basically, backhaul link transmission and reception may be performed through all CCs configured on the backhaul downlink and/or uplink. Meanwhile, backhaul link transmission and reception may be performed through A downlink CCs and/or B uplink CCs that are the same (overlapped) between the backhaul link and the access link. These two cases may be distinguished depending on transmitted information or physical channels. For instance, data (on a PDSCH or a PUSCH) may be transmitted and received on the backhaul link through all configured CCs, whereas control information (carried by a PDCCH or PDSCH on the downlink and by a PUCCH or PUSCH on the uplink) may be transmitted and received on the backhaul link through the A downlink CCs and/or the B uplink CCs that are configured commonly on both the backhaul link and the access link. In another example, the PDSCH and/or PUSCH may be transmitted and received on the backhaul link through all configured CCs and the PDCCH and/or PUCCH may be transmitted and received on the backhaul link through the A downlink CCs and/or the B uplink CCs that are configured commonly on both the backhaul link and the access link. The proposed backhaul link transmission and reception methods and their related embodiments of the present invention may be applied in the same manner to access link transmission and reception.

The eNode B may take charge of the above-described entire CC allocations to the backhaul downlink and/or uplink and the access downlink and/or uplink according to the capability of the RN during the initial setup of the RN. Or the RN may take over the access link CC configuration from among the CC allocations.

Regarding transmission of CC configuration information about the access downlink and/or uplink, if the RN directly configures access downlink and/or uplink CCs, the RN may transmit the CC configuration information to the eNode B by UE-specific or RN-specific higher-layer signaling or L1/L2 signaling during the initial setup of the RN. On the other hand, if the eNode B configures access downlink and/or uplink CCs according to the capability of the RN, the eNode B may transmit the CC configuration information to the RN by RN-specific or cell-specific higher-layer signaling or L1/L2 control signaling.

Regarding transmission of CC configuration information about the backhaul downlink and/or uplink, if the RN directly configures backhaul downlink and/or uplink CCs, the RN may transmit the CC configuration information to the eNode B by higher-layer signaling or L1/L2 signaling during the initial setup of the RN. On the other hand, if the eNode B configures backhaul downlink and/or uplink CCs according to the capability of the RN, the eNode B may transmit the CC configuration information to the RN by RN-specific or cell-specific higher-layer signaling or L1/L2 control signaling.

The eNode B's configuration (or assignment) of backhaul or access downlink and/or uplink may last from the initial setup onward without the need for additional signaling, or may change semi-statically or dynamically. The CC configuration information may be signaled to a receiver (an RN or a UE) by RN-specific or cell-specific higher-layer signaling or L1/L2 control signaling in case of the backhaul link and by RN-specific or UE-specific higher-layer signaling or L1/L2 control signaling in case of the access link. In addition, an RN's configuration of backhaul link or access link CCs may be performed selectively when needed or in parallel with the eNode B's configuration of backhaul link or access link CCs. The RN's configuration of backhaul link or access link CCs may last permanently from the initial setup onward without additional signaling, or may change semi-statically or dynamically. The backhaul link or access link CC configuration information may be signaled to a receiver (i.e. the eNode B or the UE) by RN-specific or UE-specific higher-layer signaling or L1/L2 control signaling.

Method 2

Access link CCs may be configured perfectly independently of backhaul link CCs. A part of access downlink and/or uplink CCs may be preemptively different from backhaul downlink and/or uplink CCs, and the other access downlink and/or uplink CCs may be configured independently (arbitrarily). Or, access link CCs may be configured UE-specifically for UEs within the coverage area of the RN, independently of the backhaul link CC configuration.

According to this method, perfectly different downlink CCs and/or uplink CCs may be configured for the backhaul link and the access link, or the backhaul downlink and/or uplink CCs may overlap partially with the access downlink and/or uplink CCs.

Basic methods for configuring access downlink and/or uplink CCs and additionally configuring access downlink and/or uplink primary CCs by an RN may be realized by changing an operation entity from an eNode B to an RN and replacing a backhaul link with an access link in Method 1 that describes access link CC allocation of an RN.

Resource Partitioning between Backhaul Link and Access Link

When the afore-described methods for configuring CCs and primary CCs for a backhaul link and an access link are implemented, resource partitioning or multiplexing between the backhaul link and the access link on the configured downlink and/or uplink CCs needs to be considered. The following description is given of methods for partitioning transmission resources between a backhaul downlink and/or uplink and an access downlink and/or uplink. Resource partitioning may be considered in the time domain (e.g. on a subframe basis) and/or in the frequency domain (e.g. on a CC basis).

Resource Partitioning in TDM

According to TDM resource partitioning, backhaul link transmission and reception or access link transmission and reception may be allocated on a time resource unit (a subframe) basis on every downlink and/or uplink CC configured on a backhaul link and an access link. That is, backhaul link transmission and reception may be performed on the CCs allocated to the backhaul link in a subframe and access link transmission and reception may be performed on the CCs allocated to the access link in another subframe. Therefore, irrespective of how backhaul link and/or access link CCs are allocated (i.e. irrespective of whether the backhaul link CCs and the access link CCs are allocated in association with each other or independently), one of backhaul link transmission and reception and access link transmission and reception is performed on the allocated CCs in a specific subframe. In other words, when subframe #0 is allocated to an RN, for backhaul link transmission (or reception), backhaul link transmission (or reception) is performed on CCs configured for backhaul uplink (or downlink) transmission in subframe #0. If subframe #1 is allocated to the RN for access link transmission (or reception), access downlink transmission (or reception) is performed on CCs configured for access downlink (or uplink) transmission in subframe #1.

A common backhaul/access downlink/uplink subframe allocation pattern may be applied to time resources on all CCs configured on the backhaul link and the access link.

The backhaul downlink and/or uplink subframe pattern (subframe allocation) may be defined on a 10-ms or 40-ms basis. The eNode B may provide this backhaul link subframe pattern configuration information to the RN. A subframe pattern may be set for each individual RN, commonly for all RNs within the coverage area of the eNode B, or for each RN group within the coverage area of the eNode B. Therefore, the eNode B may signal the subframe pattern information of the backhaul downlink and/or uplink to the RN(s) by RN-specific, cell-specific (RN-common), or RN group-specific higher-layer signaling (i.e. RRC signaling) or L1/L2 control signaling (i.e. on a PDCCH, a dedicated physical control channel, or a PDSCH in the form of an L2 MAC message).

Likewise, the access downlink and/or access uplink subframe pattern (subframe allocation) may be defined on a 10-ms or 40-ms basis. An access link subframe pattern may be set for each individual UE, commonly for all UEs within the coverage area of the RN, or for each UE group within the coverage area of the RN. Therefore, the eNode B may signal the subframe pattern information of the access downlink and/or uplink to the UE(s) by UE-specific, RN-specific (UE-common), or UE group-specific higher-layer signaling or L1/L2 control signaling.

Resource Partitioning in FDM

According to FDM resource partitioning, a part of J downlink CCs and K uplink CCs configured by an eNode B or an RN may be dedicated for backhaul downlink and/or uplink transmission and reception and another part of the J downlink CCs and K uplink CCs may be dedicated for access downlink and/or uplink transmission and reception. When some CC or CCs are dedicated for backhaul downlink and/or uplink transmission and reception, this may imply that the CCs are configured to be dedicated to transmission between the eNode B and the RN, compared to downlink and/or uplink transmission between the eNode B and a macro UE connected to the eNode B or that eNode B-RN transmission is multiplexed in FDM with macro UE-eNode B transmission on the CCs dedicated for backhaul downlink and/or uplink transmission and reception, compared to access link transmission. The dedicated configuration of backhaul downlink and/or uplink CCs may be interpreted in light of this meaning across the specification. The CC-wise resource partitioning is applicable to both a case where CCs are preemptively configured only for one of the backhaul link and the access link, while no CCs are configured for the other link and a case where backhaul link CCs are partially overlapped with (identical to) access link CCs.

To solve the problem caused by simultaneous transmission and reception in one CC frequency band as encountered in a single-carrier in-band RN, a backhaul downlink reception subframe may be distinguished from an access downlink transmission subframe and a backhaul uplink transmission subframe may be distinguished from an access uplink reception subframe in the FDM resource partitioning scheme, as in the TDM resource partitioning scheme.

Meanwhile, with CCs separately configured as dedicated to the backhaul link and the access link, an RN may simultaneously perform backhaul downlink reception and access downlink transmission or backhaul uplink transmission and access uplink reception on the separate dedicated CCs in a specific subframe.

In a CC configuration supporting an RN's simultaneous transmission and reception on the backhaul downlink and access downlink (or on the backhaul uplink and access uplink) according to the FDM resource partitioning, a backhaul downlink CC and an access downlink CC (or a backhaul uplink CC and an access uplink CC) may be transmitted and received through different RF ends in order to minimize interference (or RF jamming) during RN transmission and reception. Or to sufficiently eliminate interference during RN transmission and reception, CCs may be configured in such manner that a backhaul downlink CC and an access downlink CC (or a backhaul uplink CC and an access uplink CC) are sufficiently separated from each other in the frequency domain.

From the viewpoint of UEs within the RN, the RN may be perceived as an out-band RN due to the FDM resource partitioning. Meanwhile, since a plurality of CCs are aggregated, the RN may regard itself as operating in an in-band fashion in which a backhaul link CC and an access link CC are allocated in the same frequency band.

Information about CCs dedicated to the backhaul/access downlink and/or uplink may be added to backhaul/access link transmission subframe allocation information, for signaling. Backhaul link transmission resource configuration information may be signaled to RNs by cell-specific, cell cluster-specific, or RN-specific higher layer signaling (i.e. RRC signaling) or L1/L2 control signaling (i.e. on a PDCCH, a dedicated physical control channel, or a PDSCH in the form of an L2 MAC message). Access link transmission resource configuration information may be signaled to the RNs by RN-specific (UE-common) or UE-specific higher-layer signaling or L1/L2 control signaling.

Resource Partitioning in TDM/FDM

Backhaul link transmission resources may be multiplexed in TDM/FDM with access link transmission resources by configuring and assigning backhaul downlink and/or uplink subframes and CCs and access downlink and/or uplink subframes and CCs by an eNode B or an RN. Herein, configuration means selecting candidate resources as available as transmission resources and assignment means determining resources for actual transmission.

The TDM/FDM resource partitioning may be more suitable for the case where different downlink and/or uplink CCs are configured for the backhaul link and the access link.

If the backhaul downlink CCs are wholly or partially identical to the access downlink CCs, backhaul link resources and access link resources may be multiplexed (i.e. partitioned) in TDM by configuring a subframe allocated for backhaul downlink reception as an MBSFN subframe (an access downlink subframe in which only the first OFDM symbols are transmitted, while no transmission occurs in the other OFDM symbols) on the corresponding CCs. Similarly, if a backhaul uplink CC is identical to an access uplink CC, a blank subframe (a subframe type in which no transmission is occurred) is configured for the access uplink in a subframe allocated to backhaul uplink transmission. In this manner, the backhaul link resources and the access link resources may be multiplexed (partitioned) in TDM.

On the other hand, if backhaul downlink and/or uplink CCs are different from access downlink and/or uplink CCs (backhaul link dedicated CCs and access link dedicated CCs), the afore-described FDM resource partitioning is performed.

The above-described two resource partitioning schemes may be applied simultaneously to a specific subframe on configured CCs.

While it has been described that downlink and/or uplink CC(s) whose resources are partitioned in TDM between the backhaul link and the access link are mainly same CCs (or same CC indexes) configured on the backhaul link and the access link, the TDM resource partitioning is also applicable to CCs having different indexes according to the resource allocation relationship and linkage between backhaul link CCs and access link CCs, separate offsets in individual frequency areas, etc. Similarly, while it has been described that resources are partitioned in FDM between backhaul downlink and/or uplink CCs and access downlink and/or uplink CCs which have different indexes, different frequency bands may be separately defined as dedicated to the backhaul link and the access link on the same-index CC according to the linkage between backhaul link CCs and access link CCs.

The TDM resource partitioning scheme may be used when the number of backhaul link CCs is equal to or different from the number of access link CCs, when needed. Similarly, The FDM resource partitioning scheme may be used when the number of backhaul link CCs is equal to or different from the number of access link CCs, when needed.

In case of TDM/FDM resource partitioning, backhaul link transmission or access link transmission is excluded or restricted in a specific subframe in the time domain on one or more downlink CCs and/or one or more uplink CCs configured in TDM between the backhaul link and the access link. If other CCs to which FDM resource partitioning is applied are distinguished from CCs configured in TDM by different RF ends of the RN or apart from one another in the frequency domain, enough to sufficiently eliminate interference (or RF jamming), an MBSFN subframe or a blank subframe is not used in the specific subframe on the corresponding CCs and backhaul link transmission and access link transmission may take place simultaneously in the specific subframe.

In the TDM/FDM resource partitioning scheme, TDM resource partitioning and FDM resource partitioning may be selectively used at a specific time, comprehensively taking into account the states of the backhaul link and access link. For this purpose, switching between the TDM scheme and the FDM scheme may be indicated by cell-specific or RN-specific higher-layer signaling or L1/L2 control signaling, or predefined as a periodical pattern for one or more radio frames.

Now, a description will be given of TDM/FDM resource partitioning, taking examples.

It is first assumed that A (A≥2) downlink CCs are distinguished from each other by different RF ends of an RN or apart from each other in the frequency domain, enough to sufficiently eliminate interference (or RF jamming). The A downlink CCs are configured on the backhaul downlink and B (1<B≤A) downlink CCs selected from among the A downlink CCs are configured on the access downlink. In this case, resources are partitioned in TDM between the backhaul link and the access link using an MBSFN subframe on the B downlink CCs common to the backhaul downlink and the access downlink. On the other hand, backhaul downlink reception is performed in any subframe on the (A-B) downlink CCs confined to the backhaul link irrespective of access downlink transmission.

It is also assumed that C (C≥2) uplink CCs are distinguished from each other by different RF ends of the RN or apart from each other in the frequency domain, enough to sufficiently eliminate interference (or RF jamming). The C uplink CCs are configured on the backhaul uplink and D (1<B≤A) uplink CCs selected from among the C uplink CCs are configured on the access uplink. In this case, resources are partitioned in TDM between the backhaul link and the access link using a blank subframe on the D uplink CCs common to the backhaul uplink and the access uplink. On the other hand, backhaul uplink transmission is performed in any subframe on the (C-D) uplink CCs confined to the backhaul link irrespective of access uplink reception.

The opposite case where the CC configurations of the backhaul link and the access link in the above example are applied to the access link and the backhaul link will be described, taking an example. That is, A downlink CCs are configured on the access downlink and B (1<B≤A) downlink CCs selected from among the A downlink CCs are configured on the backhaul downlink. In this case, resources are partitioned in TDM between the backhaul link and the access link using an MBSFN subframe on the B downlink CCs common to the backhaul downlink and the access downlink. On the other hand, access downlink transmission is performed in any subframe on the (A-B) downlink CCs confined to the access link irrespective of backhaul downlink reception.

C downlink CCs are configured on the access uplink and D (1<D≤C) uplink CCs selected from among the C downlink CCs are configured on the backhaul uplink. In this case, resources are partitioned in TDM between the backhaul link and the access link using a blank subframe on the D uplink CCs common to the backhaul uplink and the access uplink. Meanwhile, access uplink reception is performed in any subframe on the (C-D) uplink CCs confined to the access link irrespective of backhaul uplink transmission.

The above-described downlink CC configuration and uplink CC configuration may be performed simultaneously. Further, aggregations of predetermined numbers of CCs may be modularized so that resource partitioning can be performed on a group basis in a modularized fashion according to a corresponding case in the above examples.

The followings are issues to be considered in implementing the foregoing TDM/FDM resource partitioning.

(1) A uniform backhaul downlink subframe assignment (or a uniform backhaul uplink subframe assignment) may be configured for all CCs configured on the backhaul downlink (or the backhaul uplink). Subframe assignment configuration refers to the configuration of a subframe pattern.

Or, different backhaul downlink subframe assignments (different backhaul uplink subframe assignments) may be configured for the CCs configured on the backhaul downlink (or the backhaul uplink). Configuration of different backhaul link subframes for different CCs may involve separately configuring a backhaul link subframe for each CC or each CC group.

In this case, some downlink CCs (or uplink CCs) may be configured for the backhaul link and other downlink CCs (or uplink CCs) may be configured for the access link, in a specific subframe.

The eNode B or the RN may transmit information about configuration of each backhaul downlink/uplink subframe and CC by cell-specific, RN-specific (UE-common), or UE-specific higher-layer signaling or L1/L2 signaling.

(2) Backhauling CCs to which backhaul subframes can be allocated may be configured from among J downlink CCs and K uplink CCs. The eNode B may configure such downlink/uplink backhauling CCs separately for individual RNs. For this purpose, RN-specific higher-layer signaling or L1/L2 control signaling may be used. Or the same downlink/uplink backhauling CCs may be configured for all RNs within the coverage area of the eNode B. For this purpose, the configuration information may be broadcast to all RNs within the coverage area of the eNode B by cell-specific higher-layer signaling or L1/L2 control signaling.

A backhaul link subframe may be allocated only to the backhauling CCs among the downlink/uplink CCs, and access link transmission and reception may be performed in every subframe on the remaining CCs.

In addition, transmission resources may be partitioned between the backhaul link and the access link in TDM on a subframe basis on the downlink/uplink backhauling CCs.

In configuring downlink/uplink backhauling CCs, information about the indexes of CCs configured as the backhauling CCS and a backhaul link subframe pattern (set on a CC basis or set commonly to CCs) may be transmitted by cell-specific or RN-specific higher-layer signaling or L1/L2 control signaling.

Embodiments of TDM/FDM Resource Partitioning

With reference to FIGS. 9 to 12, various embodiments of TDM/FDM resource partitioning (or multiplexing) between a backhaul link and an access link will be described below. While there are three downlink CCs and three uplink CCs in FIGS. 9 to 12, this is purely exemplary and thus does not limit the present invention. The number of downlink CCs may be equal to or different from the number of uplink CCs.

As described above, if an in-band RN receives a backhaul downlink in a subframe from an eNode B, it cannot transmit an access downlink signal in the subframe to a UE. However, the UE expects to receive a control channel in every subframe. Accordingly, the RN may receive a backhaul downlink signal from the eNode B in a symbol area free of access link transmission to the UE in an MBSFN subframe (the first two OFDM symbols of the subframe are transmitted and no signal is transmitted in the remaining OFDM symbols of the subframe). That is, backhaul downlink reception of the RN is limited to subframes that can be allocated as MBSFN subframes.

In the illustrated cases of FIGS. 9 to 12, one radio frame of a downlink CC is divided into 10 subframes (subframe #0 to subframe #9). In case of an FDD radio frame structure, subframes #0, #4, #5 and #9 of a radio frame are set to deliver a synchronization signal, a Physical Broadcast Channel (PBCH), a paging indicator, or a paging channel. Since subframes #0, #4, #5 and #9 cannot be allocated as MBSFN subframes, these subframes are not available for backhaul downlink reception. On the other hand, in case of a TDD radio frame structure, subframes #0, #1, #5 and #6 are set to deliver a synchronization signal, a PBCH, a paging indicator, or a paging channel. Thus, these subframes cannot be allocated for backhaul downlink reception. While the following description is given of embodiments of the present invention in the context of the FDD radio frame structure, which should not be construed as limiting the present invention, it is to be understood that the present invention is also applicable to the TDD radio frame structure based on a similar principle.

Figure 9:
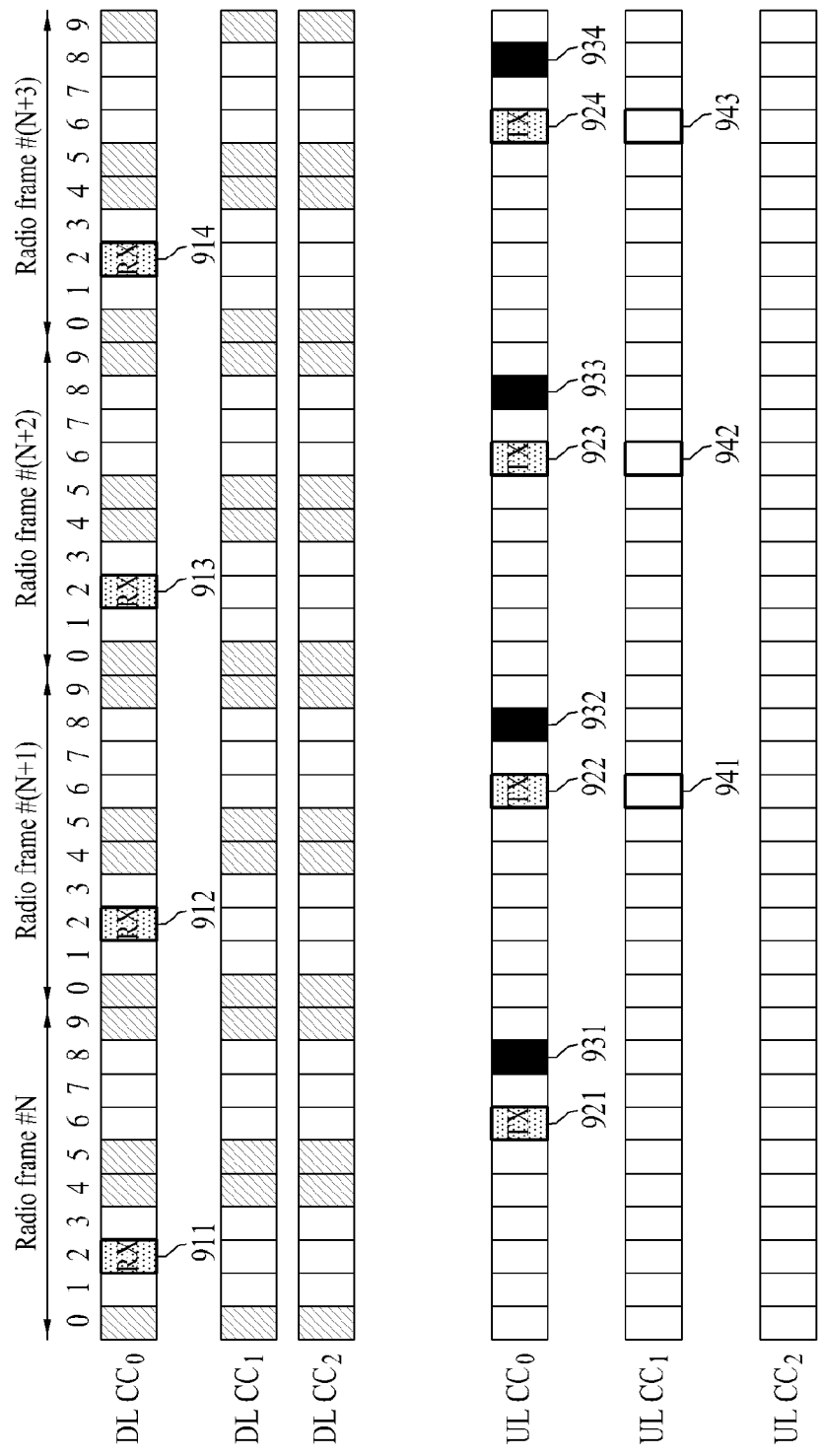
FIG. 9 illustrates resource partitioning between a backhaul link and an access link according to an embodiment of the present invention.

Meanwhile, if an HARQ feedback (ACK/NACK) and retransmission period for backhaul link transmission is 8 TTIs as is conventional, an HARQ operation may not be performed normally due to the presence of subframes unavailable for backhaul downlink reception. In FIG. 9, for example, upon receipt of a backhaul downlink signal on DL $CC_0$ in subframe #2 of radio frame #N, an RN transmits a backhaul uplink HARQ feedback, for example, a NACK message on UL $CC_0$ 4 TTIs later, that is, in subframe #6 of radio frame #N. Thus, the RN is supposed to receive a backhaul downlink signal on DL $CC_0$ 4 TTIs later, that is, in subframe #0 of radio frame #(N+1). However, subframe #0 cannot be allocated as an MBSFN subframe, which makes it impossible to perform the conventional HARQ operation.

In this context, an HARQ operation scheme may be used, in which an ACK/NACK feedback is received in backhaul uplink subframe #(n+4) for a backhaul downlink signal transmitted in backhaul downlink subframe #n and an ACK/NACK feedback is received in backhaul downlink subframe #(n+6) for a backhaul uplink signal transmitted in backhaul uplink subframe #n (a backhaul downlink or uplink subframe is allocated every 10 ms in this scheme, Embodiment 1). Or if a backhaul downlink subframe is subframe #4 or #9, the backhaul downlink subframe is shifted forward by one subframe (i.e. to subframe #3 or #8) and if a backhaul downlink subframe is subframe #0 or #5, the backhaul downlink subframe is shifted backward by one subframe (i.e. to subframe #1 or #6) (a backhaul downlink subframe shifting scheme, Embodiment 2). Or if a backhaul downlink subframe is one of subframes #0, #4, #5 and #9, the backhaul downlink subframe and a backhaul uplink subframe corresponding to the backhaul downlink subframe are allocated 4 subframes later (a backhaul downlink subframe puncturing scheme).

A detailed description will be given of methods for partitioning resources in TDM/FDM between a backhaul link and an access link, taking into account the above considerations according to embodiments of the present invention.

Embodiment 1

Referring to FIG. 9, it is assumed that backhaul and access downlink subframes are configured on DL $CC_0$, backhaul, backhaul and access uplink subframes corresponding to the backhaul and access downlink subframes are configured on UL $CC_0$, and backhaul downlink subframes 911, 912, 913 and 914 or backhaul uplink subframes 921, 922, 923 and 924 are allocated every 10 ms in relation to the above-described HARQ timing.

Meanwhile, without introduction of RNs, a synchronous non-adaptive HARQ operation with an 8-ms period (a Round Trip Time (RTT) of 8 ms) as defined in the legacy LTE system is performed for a legacy UE (e.g. an LTE Release-8 UE). For example, upon receipt of an access uplink signal from a UE on UL $CC_0$ (931), an RN transmits an HARQ feedback on DL $CC_0$, 4 TTIs later (912). The downlink subframe 912 is an MBSFN subframe in which an HARQ feedback can be transmitted to the UE on a PHICH included in the first two OFDM symbols. If the HARQ feedback is a NACK signal, the UE needs to retransmit the access uplink signal 4 TTIs later, that is, in the subframe 922. However, the subframe 922 has been allocated for backhaul uplink transmission and thus collision occurs between access uplink transmission and backhaul uplink transmission. The subframes 931, 932, 933 and 934 on UL $CC_0$ are subframes vulnerable to collision between a backhaul uplink transmission and a first access uplink retransmission (i.e. subframes 8 ms after an initial transmission).

To solve the problem, resources may be partitioned in TDM/FDM between the backhaul link and the access link. That is, as a synchronous adaptive HARQ operation, information indicating that the uplink CC on which the access uplink transmission (i.e. the first access uplink retransmission) is vulnerable to collision is switched to another CC (UL $CC_1$ or UL $CC_2$) may be transmitted in a UL grant. The UL grant may be transmitted to the UE 4 subframes earlier. For LTE-A UEs, a UL grant DCI format may be defined separately so as to define a field indicating CC switching in the payload of the DCI format. For example, if a CC allocated for access uplink transmission is switched from UL $CC_0$ to UL $CC_1$, PUSCHs that the UE transmits in the subframes 931, 932 and 933 on UL $CC_0$ may be retransmitted respectively in subframes 941, 942 and 943 on UL $CC_1$.

The above description is detailed below.

(1) In the subframes 931, 932 and 933 that causes a problem in a synchronous non-adaptive HARQ operation, access uplink transmission resources (resources for initial transmission or retransmission of a PUSCH) may be allocated only to LTE-A UEs, not to legacy LTE UEs.

(2) If a feedback for data received in the access uplink subframes 931, 932, 933 and 934 is a NACK signal, scheduling information indicating access uplink resources for retransmission is transmitted to the UE by a UL grant according to a synchronous adaptive HARQ operation.

(3) A UL grant PDCCH may be transmitted in a PDCCH physical resource region (the first 2 OFDM symbols of a subframe) allowed for access downlink transmission in the MBSFN subframes 912, 913 and 914. Or, the UL grant PDCCH may be transmitted in a PDCCH physical resource region on DL $CC_1$ or DL $CC_2$ instead of DL $CC_0$ according to a preset rule or by signaling higher-layer (RRC) configuration control information.

(4) Information included in the UL grant will be described in detail. A carrier switching indication bit is transmitted in the UL grant. Carrier switching means retransmission on a different UL CC from a UL CC used for initial transmission of access uplink data. Herein, a corresponding DCI format may be defined as a format for LTE-A UEs for which access links have been established. Carrier switching indication bits may form a bitmap to indicate CCs associated with uplink carrier switching. Or if a UL CC to be switched to is predefined according to a predetermined rule or higher-layer (RRC) signaling, the carrier switching indication bit may be a 1-bit field only to indicate that carrier switching is needed.

(5) Carrier switching indication bits may be defined as a bitmap or indirect carrier index ordering information with respect to the logical order of UL CCs. The indexes of UL CCs to be switched to may be transmitted by the UL grant. For example, if an initial transmission takes place on UL $CC_0$ and UL $CC_0$ is switched to UL $CC_1$ for retransmission, '1' may be signaled. If UL $CC_0$ is switched to UL $CC_2$ for retransmission, '2' may be signaled.

(6) The UL grant may further include information about the resource assignment, transmission Modulation and Coding Scheme (MCS), HARQ process identification of a UL CC to be used for retransmission. In this case, HARQ processes may be defined in such a manner that HARQ configurations for a plurality of uplink CCs can be identified.

Embodiment 2

Figure 10:
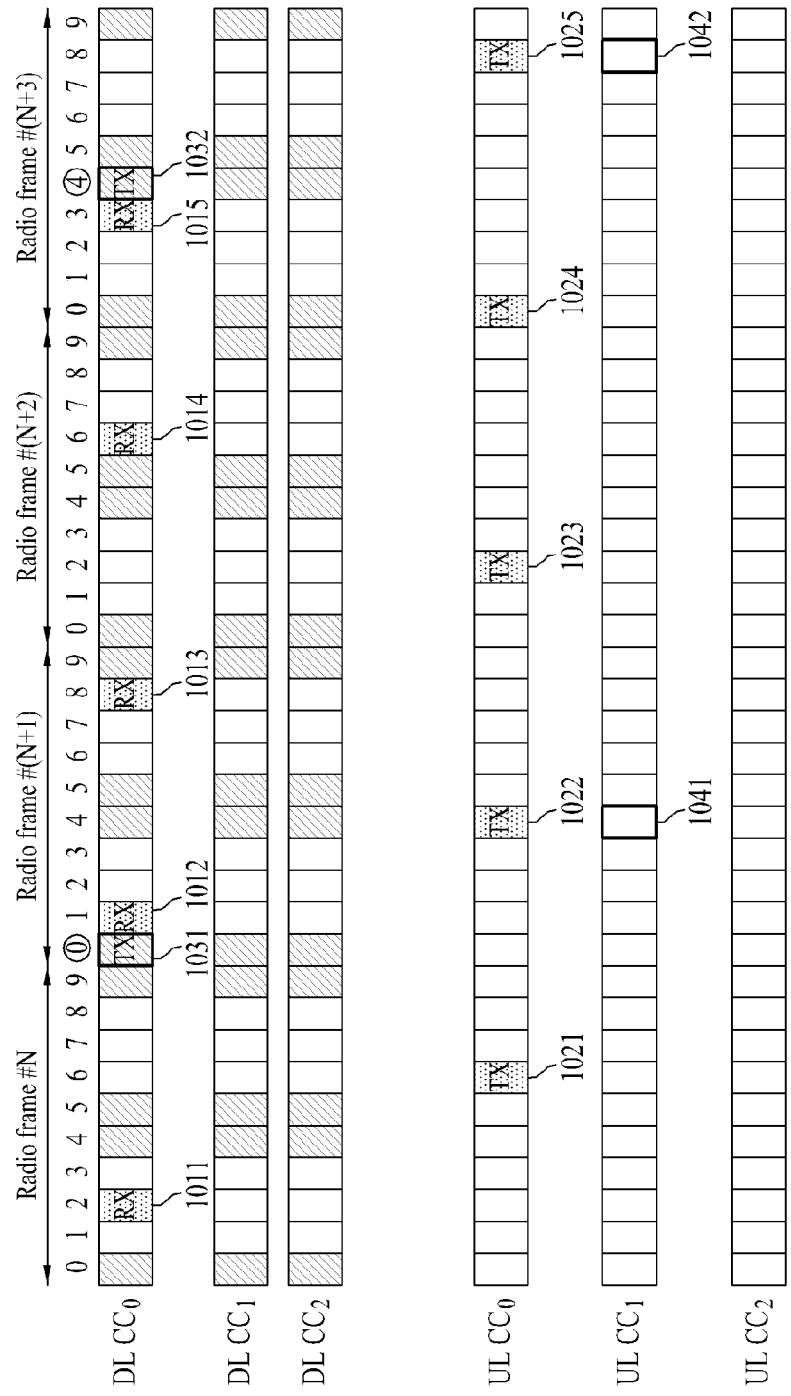
FIG. 10 illustrates resource partitioning between a backhaul link and an access link according to another embodiment of the present invention.
Figure 11:
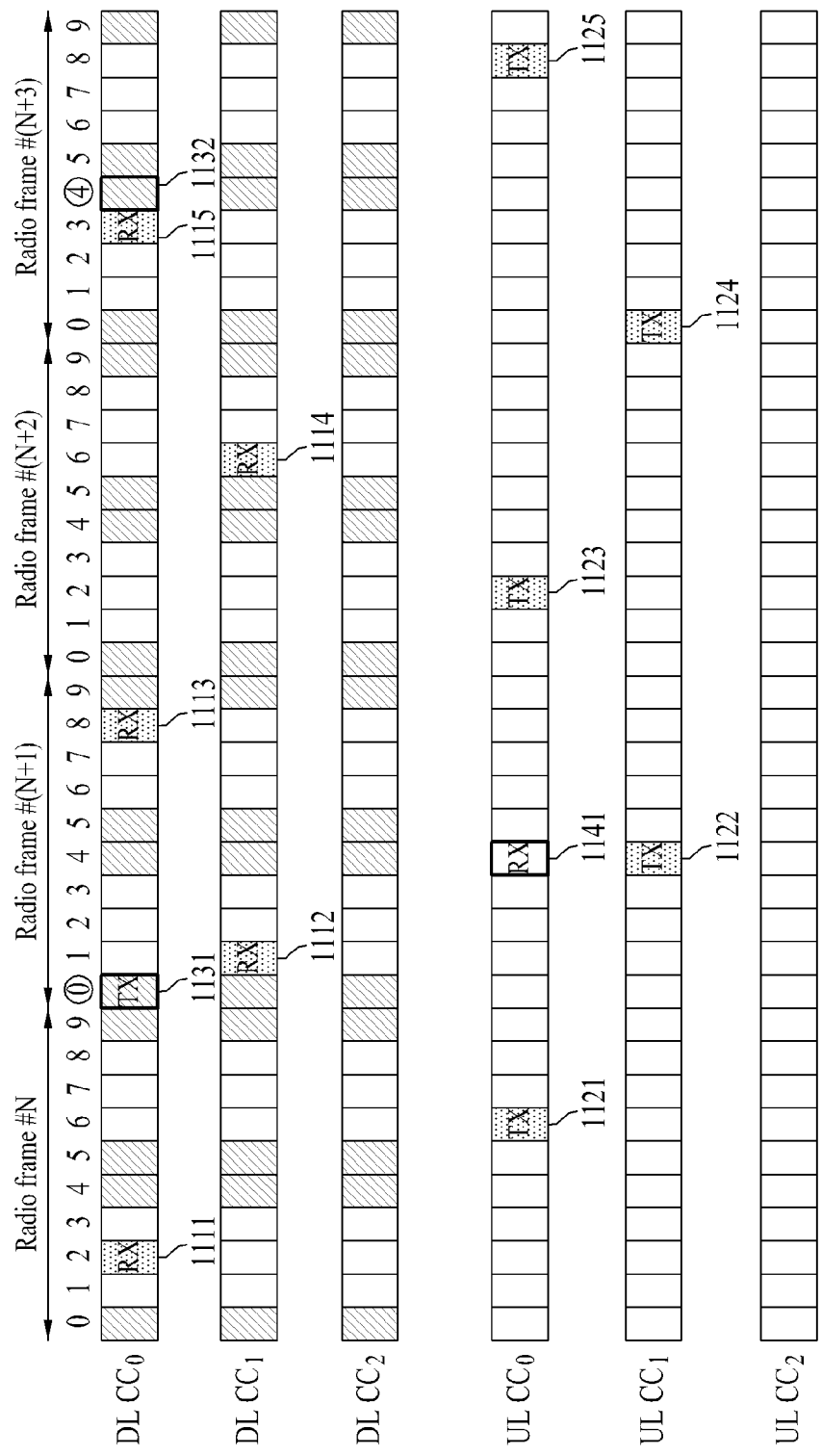
FIG. 11 illustrates resource partitioning between a backhaul link and an access link according to another embodiment of the present invention.

Referring to FIG. 10, backhaul downlink subframes 1011, 1012, 1013, 1014 and 1015 on DL $CC_0$ or backhaul uplink subframes 1021, 1022, 1023, 1024 and 1025 on UL $CC_0$ are allocated basically every 8 ms, taking into account the 8-ms HARQ timing. However, subframes that cannot be allocated as MBSFN subframes (subframes #0, #4, #5 and #9) among the backhaul downlink subframes are shifted (subframes #4 and #9 are shifted to subframes #3 and #8, respectively and subframes #5 and #0 are shifted to subframes #6 and #1, respectively). Therefore, the backhaul link subframe allocation pattern has a 40-ms period (5 subframes are allocated at an interval of 7, 8 or 9 subframes during the duration of 40 ms). The backhaul uplink subframe pattern has an 8-ms period.

For example, if the subframe 1031 or 1032 of DL $CC_0$ is allocated for access downlink data (PDSCH) transmission, an HARQ feedback may be received from a UE on UL $CC_0$ in response to the transmitted access downlink data, 4 TTIs later (i.e. in the subframe 1022 or 1025). However, since the subframe 1022 or 1025 of UL $CC_0$ has been allocated for backhaul uplink transmission in the above-described backhaul uplink and downlink subframe assignment, backhaul uplink transmission may collide with the HARQ feedback reception from the UE on the access uplink.

To solve the problem, an uplink CC to carry an ACK/NACK signal may be designated through switching. That is, subframes in which an ACK/NACK feedback will be received for an access downlink transmission in the subframes 1031 and 1032 on DL $CC_0$ may be set as the subframes 1041 and 1042 of UL $CC_1$, not UL $CC_0$.

In this context, the subframes that cause a problem in FIG. 10, that is, the subframes 1031 and 1032 of DL $CC_0$ may be allocated only to LTE-A UEs. In relation to this access downlink PDSCH resource allocation, a bit field indicating a CC to carry an access uplink ACK/NACK signal for a corresponding PDSCH may be defined in the payload of the DCI format of a DL channel assignment PDCCH. The CC indicating bit size may be enough to support information about uplink CCs to carry ACK/NACK signals or a bitmap indicating the positions of the uplink CCs to carry ACK/NACK signals. Or if CCs are preset according to a predetermined implicit rule or by higher-layer (RRC) signaling, the CC indicating bit size may be 1 bit to indicate only carrier switching for ACK/NACK transmission.

The followings are issues to be considered for implementation of the embodiment of the present invention.

(1) In the subframes 1031 and 1032 of DL $CC_0$ that cause a problem in the illustrated case of FIG. 10, access downlink reception resources (PDSCH transmission resources) may be allocated only to LTE-A UEs, not to legacy LTE UEs.

(2) If the subframes 1022 and 1025 are allocated for backhaul uplink transmission and thus are not available for ACK/NACK feedback reception on UL $CC_0$ for access downlink PDSCHs transmitted in the subframes 1031 and 1032 of DL $CC_0$, a carrier switching indication bit for configuring an access uplink CC to carry an ACK/NACK feedback may be included in the DCH format payload of a DL channel assignment PDCCH for the PDSCHs.

(3) When carrier switching occurs to a carrier on which the UE transmits an ACK/NACK signal, the index of a UL CC designated for ACK/NACK transmission may be signaled by a downlink assignment each time. The carrier switching bit size may be set to include the index or logical CC ordering information of a designated UL CC. Or UL CCs to carry ACK/NACK signals may be preset and broadcast to all LTE-A UEs by higher-layer (RRC) signaling. Herein, a 1-bit carrier switching indicator may be defined only to indicate carrier switching triggering.

(4) An additional PUCCH may be RRC-configured for ACK/NACK feedback transmission on an uplink CC designated for ACK/NACK transmission. Or, an implicit resource allocation scheme may be used or a modified implicit resource allocation scheme may be used by setting a specific offset for resource allocation to prevent resource collision between ACK/NACK transmission and backhaul transmission. For this purpose, ACK/NACK PUCCH resources may be allocated or an ACK/NACK signal may be piggybacked to a PUSCH. In this case, an additional UL grant needs to be transmitted.

Embodiment 3

A scheme for carrier hopping in a backhaul subframe pattern will be described as another method for solving the problem described before in Embodiment 2, with reference to FIG. 11. Backhaul subframes may be allocated to different CCs (CC hopping) according to a backhaul subframe pattern having a predetermined period. For instance, although backhaul subframes are allocated only to DL $CC_0$ and UL $CC_0$ during the duration of 40 ms in the backhaul subframe allocation with the period of 40 ms illustrated in FIG. 10, subframes 1111, 1113 and 1115 are allocated to DL $CC_0$ and subframes 1112 and 1114 are allocated to DL $CC_1$ through carrier hopping, while subframes 1121, 1123 and 1125 are allocated to UL $CC_0$ and subframes 1122 and 1124 are allocated to UL $CC_1$ through carrier hopping, during 40 ms in the embodiment of the present invention.

According to Embodiment 3, for example, if the subframe 1131 of DL $CC_0$ is allocated for access downlink data (PUSCH) transmission, an HARQ feedback may be received on UL $CC_0$ from a UE 4 TTIs later (i.e. in the subframe 1141)

in response to the transmitted access downlink data. Since the backhaul uplink transmission subframe 1122 is allocated to UL $CC_1$ through carrier hopping and the access link HARQ feedback subframe 1141 is received on UL $CC_0$, the backhaul uplink transmission and the access uplink reception can be performed on different uplink CCs in the same subframe (i.e. subframe #4 of radio frame #(N+1)).

Embodiment 4

Figure 12:
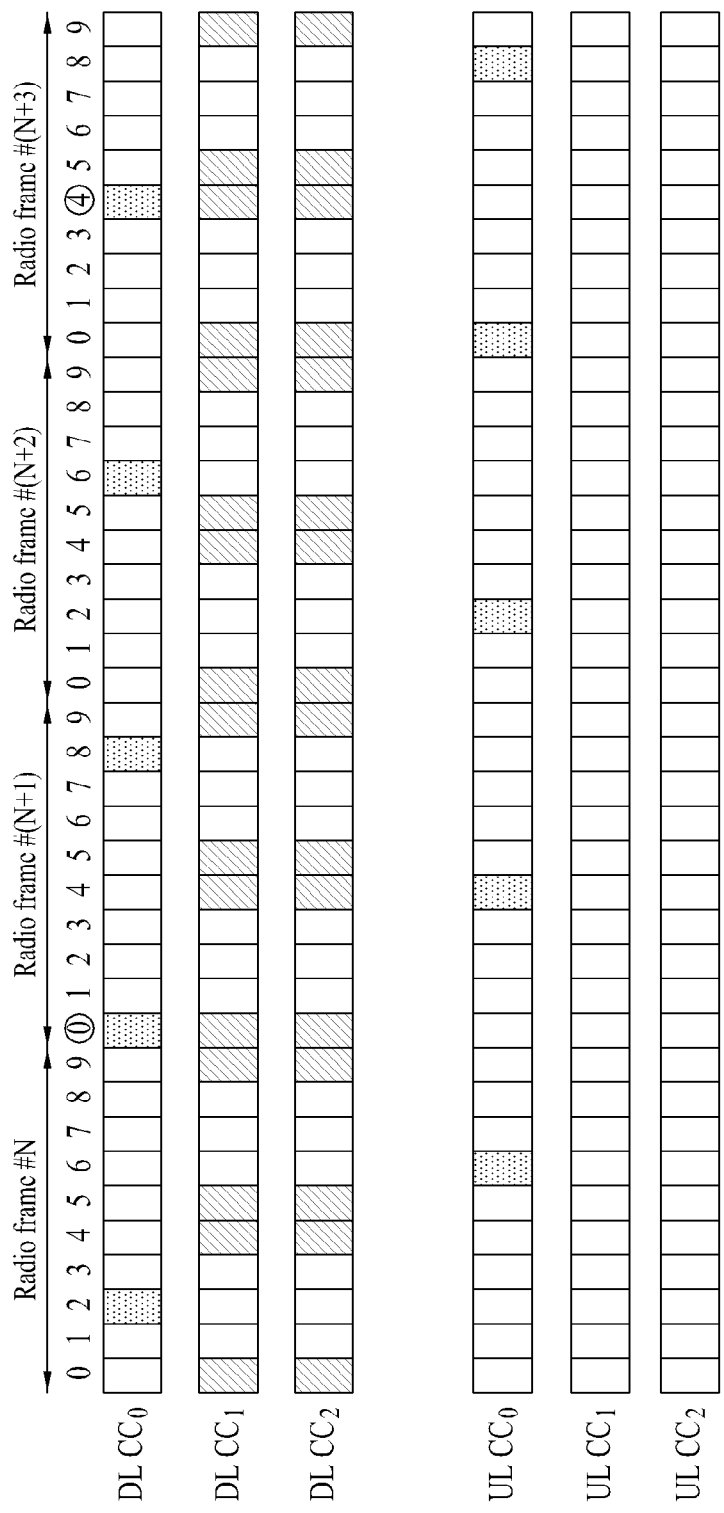
FIG. 12 illustrates resource partitioning between a backhaul link and an access link according to a further embodiment of the present invention.

With reference to FIG. 12, a description will be given below of a method for defining LTE-A dedicated downlink CCs in configuring CCs for a backhaul downlink and an access downlink. For example, DL $CC_0$ may be defined as a CC on which every subframe may be allocated for backhaul downlink reception, without limitations that the legacy LTE system (e.g. LTE Release 8) faces. That is, none of subframes that cannot be allocated as MBSFN subframes due to transmission of a physical synchronization signal, a PBCH, a paging indicator, or a paging channel on the access link (e.g. subframes #0, #4, #5 and #9 in case of an FDD radio frame structure) in the legacy LTE system exist on the LTE-A dedicated downlink CCs. If backhaul subframes are allocated only on the LTE-A dedicated downlink CCs, the conventional 8 ms-RTT synchronous HARQ operation may still be used without any modification. Similarly, UL $CC_0$ may be defined as an LTE-A dedicated CC, for use in backhaul uplink transmission in FIG. 12.

In addition, access downlink or uplink dedicated CCs may be defined for use in allocating access downlink or uplink subframes.

Meanwhile, when one or more CCs are configured RN-specifically or cell-specifically (RN-commonly) for a backhaul downlink, an access downlink, and/or an access uplink, extension CCs may be defined. An extension CC may be a CC on which no PDCCH is defined, in case of a downlink CC. Or a carrier on which a Cell-Specific Reference Signal (CRS), a Primary Synchronization Signal (PSS), a Secondary Synchronization Signal (SSS), a Primary Broadcast CHannel (PBCH), a Dynamic BCH (DBCH), or a Paging CHannel (PCH) as well as a PDCCH is not defined may be said to be an extension CC. That is, an extension CC may be allocated only together with another perfect CC, not independently.

Regarding extension CCs, the following issues may further be considered in various methods and embodiments of the present invention related to CC configuration/assignment and primary CC configuration.

If a downlink CC configured for downlink transmission is an extension CC, no methods that are modified due to limitations that prohibit use of an MBSFN subframe need to be considered in TDM resource partitioning between backhaul downlink reception and access downlink transmission. That is, subframes #0, #4, #5 and #9 carrying a synchronization signal in an FDD radio frame cannot be configured as MBSFN subframes to ensure backward compatibility supporting measurements of legacy LTE UEs within the coverage area of an RN. However, an extension CC does not need to carry a synchronization signal and thus backhaul downlink reception can be performed in every subframe of the extension CC by configuring the subframe into an MBSFN subframe structure.

That is, regarding an MBSFN subframe structure, an RRC parameter given as a 6-bit bitmap parameter in a subframe pattern having a period of 10 ms may be set as a 10-bit bitmap parameter in a subframe pattern having a period of 10 ms for an extension carrier. Likewise, an RRC parameter given as a 24-bit bitmap parameter in a subframe pattern having a period of 40 ms may be set as a 40-bit bitmap parameter in a 40 ms-period subframe pattern for an extension CC.

In addition, if CCs having no PDCCH defined on them are configured as extension CCs for the backhaul downlink and the access downlink, primary CC configuration and cross-carrier scheduling are considered. That is, a specific downlink primary CC may be configured, and resources may be allocated and a transmission mode may be set for access downlink (PDSCH) transmission, backhaul downlink data (R-PDSCH) reception, access uplink data (PUSCH) reception, and backhaul uplink data (R-PUSCH) transmission through a PDCCH (a DL channel assignment PDCCH or a UL grant PDCCH) having a DCI format including a CIF on the primary CC.

Figure 13:
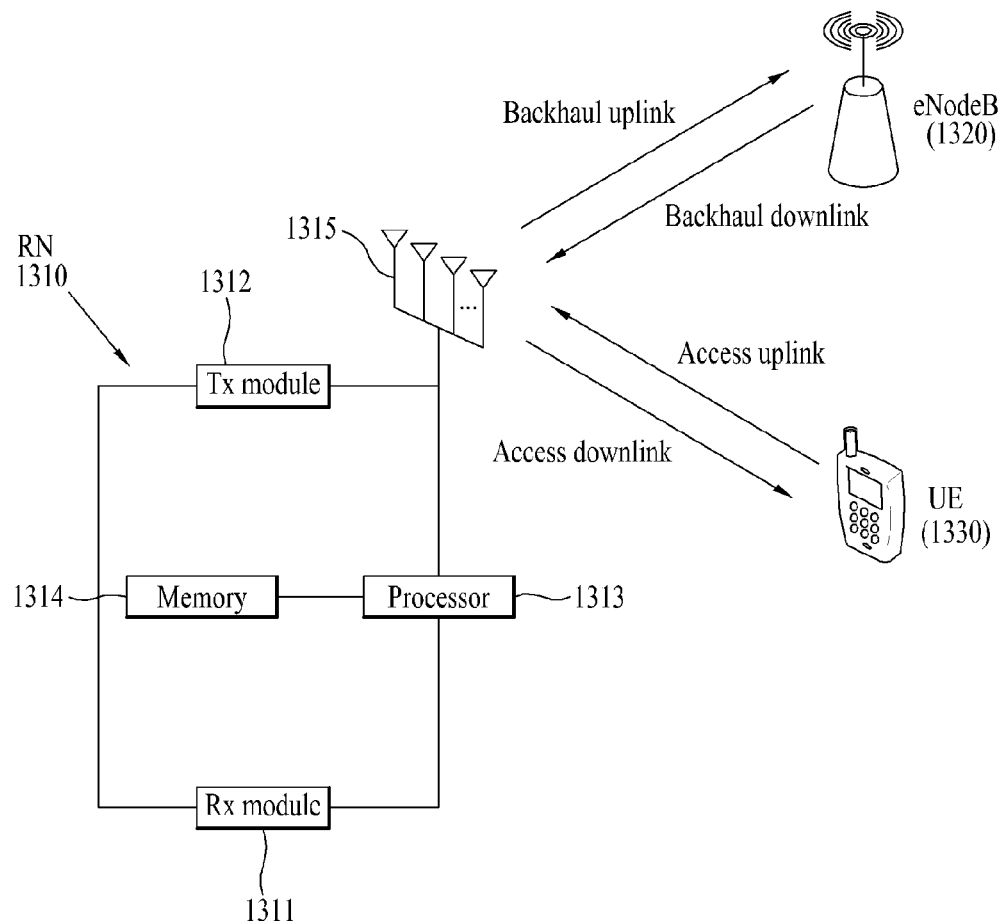
FIG. 13 is a block diagram of a wireless communication system including an RN device, an eNB device, and a UE device according to a preferred embodiment of the present invention.

FIG. 13 is a block diagram of a wireless communication system including an RN device, an eNode B device, and a UE device according to a preferred embodiment of the present invention.

The RN 1310 may transmit and receive control information and/or data to and from the eNode B 1320 on the backhaul uplink and the backhaul downlink.

The RN 1310 may include a Reception (Rx) module 1311, a Transmission (Tx) module 1312, a processor 1313, a memory 1314, and a plurality of antennas 516. The use of the plurality of antennas implies that the RN 1310 supports Multiple Input Multiple Output (MIMO).

The Rx module 1311 may receive signals, data, and information from the eNode B on the backhaul downlink and from the UE on the access uplink. The Tx module 1312 may transmit signals, data, and information to the eNode B on the backhaul uplink and to the UE on the access downlink. The processor 1313 may provide overall control to the RN 1310. Especially, the processor 1313 may control transmission and reception of signals, data, and information through the Rx module 1311 and the Tx module 1312.

According to the preferred embodiment of the present invention, the RN 1310 supports transmission and reception on multiple carriers. That is, the RN 1310 may communicate with the eNode B 1320 and the UE 1330 on one or more CCs. The eNode B 1320 or the RN 1310 may configure uplink and downlink CCs and primary CCs on the backhaul link and/or the access link. The afore-described various embodiments of configuring uplink/downlink CCs and primary CCs on the backhaul link/access link may be implemented by the processor 1313 in the RN 1310. In addition, the RN 1310 or the eNode B 1320 may partition resources between the backhaul link and the access link. Resource partitioning means allocation of frequency resources (e.g. a frequency band of a CC) and time resources (e.g. a subframe), for transmission and reception on the backhaul link and the access link. The afore-described various resource partitioning schemes may be implemented by the processor 1313 in the RN 1310.

The processor 1313 of the RN 1310 that allocates backhaul link and access link resources in the multi-carrier wireless communication system may be configured according to an embodiment of the present invention, as follows.

The processor 1313 may be configured to determine a subframe pattern for backhaul uplink transmission on a first uplink CC. The backhaul link subframe pattern may be configured and indicated to the RN by the eNode B. A subframe pattern for backhaul downlink reception on a first downlink CC and an HARQ operation may be configured based on the subframe pattern for backhaul uplink transmission on the first uplink CC. For example, the subframe pattern for backhaul downlink reception on the first downlink CC may be a 10 ms-period pattern (the backhaul link subframe pattern for DL $CC_0$ and UL $CC_0$ in FIG. 9) or a 40 ms-period pattern (the backhaul link subframe pattern for DL $CC_0$ and UL $CC_0$ in FIG. 10), in subframes other than subframes unavailable for configuring MBSFN subframes.

The processor 1313 may also be configured to determine a subframe requiring access uplink reception on the first uplink CC according to a synchronous HARQ operation. The synchronous HARQ operation may have an RTT of 8 TTIs. For example, an ACK/NACK signal may be transmitted to a UE in subframe #(n+4) of the first downlink CC in response to data received from the UE in subframe #n of the first uplink CC. If a NACK signal is transmitted, the UE may retransmit the data in subframe #(n+8) of the first uplink CC. Or data may be transmitted to the UE in subframe #m of the first downlink CC and the UE may transmit an ACK/NACK feedback to the RN in subframe #(m+4) of the first uplink CC. That is, a subframe requiring access uplink reception on the first uplink CC according to the synchronous HARQ operation corresponds to subframe #(n+8) requiring a first access uplink retransmission on the first uplink CC in the former case or subframe #(m+4) requiring ACK/NACK transmission on the first uplink CC in the latter case.

In addition, the processor 1313 may be configured to determine whether a subframe requiring access uplink reception on the first uplink CC is identical to a subframe allocated for backhaul uplink transmission. If both subframes are identical, the processor 1313 may be configured to transmit resource allocation control information including carrier switching indication information to the UE via the Tx module.

The carrier switching indication information may include information indicating allocation of the subframe for access uplink reception in the synchronous HARQ operation to a second uplink CC, not to the first uplink CC. The carrier switching indication information may also include the index of the second uplink CC. If a CC to be switched to (i.e. the second uplink CC) is preset by higher-layer signaling, the carrier switching indication information may include carrier switching triggering information.

Meanwhile, the resource allocation control information including the carrier switching indication information that the processor 1313 transmits to the UE may be a UL grant including information indicating a CC on which an access uplink signal is to be retransmitted or a DL assignment including information indicating a CC on which an ACK/NACK feedback for transmitted access downlink data is to be transmitted.

Besides, the processor 1313 of the RN 1310 processes received information and information to be transmitted to the outside. The memory 1314 may store the processed information for a predetermined time and may be replaced by a component such as a buffer (not shown).

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

Industrial Applicability

The above-described embodiments of the present invention can be applied to a variety of mobile communication systems.

The invention claimed is:

1. A method for allocating resources at a Relay Node (RN) in a multi-carrier supporting wireless communication system, comprising:
    determining a subframe pattern for backhaul uplink transmission from the RN to a Base Station (BS) on a first uplink Component Carrier (CC);
    determining a subframe requiring access uplink reception from a User Equipment (UE) at the RN on the first uplink CC according to a synchronous Hybrid Automatic Repeat reQuest (HARQ) operation; and
    transmitting resource allocation control information including carrier switching indication information to the UE, if a subframe allocated for the backhaul uplink transmission is identical to the subframe requiring access uplink reception from the UE at the RN.

2. The method according to claim 1, wherein the carrier switching indication information includes information indicating that the subframe requiring access uplink reception according to the synchronous HARQ operation is allocated to a second uplink CC.

3. The method according to claim 2, wherein the carrier switching indication information includes at least one of information about an index of the second uplink CC and carrier switching triggering information.

4. The method according to claim 1, wherein the subframe requiring access uplink reception on the first uplink CC is a subframe for reception of access uplink retransmission data according to the synchronous HARQ operation, and the resource allocation control information is an uplink grant.

5. The method according to claim 1, wherein the subframe requiring access uplink reception on the first uplink CC is a subframe for feedback reception in response to transmitted access downlink data according to the synchronous HARQ operation, and the resource allocation control information is a downlink assignment for the backhaul downlink data transmission.

6. The method according to claim 1, wherein the subframe pattern for backhaul uplink transmission on the first uplink CC forms a subframe pattern for backhaul downlink reception on the first downlink CC and an HARQ operation.

7. The method according to claim 6, wherein the subframe pattern for backhaul downlink reception on the first downlink CC is a 10 ms-period pattern or a 40 ms-period pattern in subframes other than subframes in which configuration of MBSFN subframes are restricted.

8. A Relay Node (RN) for allocating resources in a multi-carrier supporting wireless communication system, comprising:
    a reception module for receiving a backhaul downlink signal from a Base Station (BS) and receiving an access uplink signal from a User Equipment (UE);
    a transmission module for transmitting a backhaul uplink signal to the BS and transmitting an access downlink signal to the UE; and
    a processor for controlling the reception module and the transmission module,
    wherein the processor is configured to determine a subframe pattern for backhaul uplink transmission from the RN to the BS on a first uplink Component Carrier (CC), to determine a subframe requiring access uplink reception from the UE at the RN on the first uplink CC according to a synchronous Hybrid Automatic Repeat reQuest (HARQ) operation, and to transmit resource allocation control information including carrier switching indication information to the UE, if a subframe allocated for the backhaul uplink transmission is identical to the subframe requiring access uplink reception from the UE at the RN.

9. The RN according to claim 8, wherein the carrier switching indication information includes information indicating that the subframe requiring access uplink reception according to the synchronous HARQ operation is allocated to a second uplink CC.

10. The RN according to claim 8, wherein the carrier switching indication information includes at least one of information about an index of the second uplink CC and carrier switching triggering information.

11. The RN according to claim 8, wherein the subframe requiring access uplink reception on the first uplink CC is a subframe for reception of access uplink retransmission data according to the synchronous HARQ operation, and the resource allocation control information is an uplink grant.

12. The RN according to claim 8, wherein the subframe requiring access uplink reception on the first uplink CC is a subframe for feedback reception in response to transmitted access downlink data according to the synchronous HARQ operation, and the resource allocation control information is a downlink assignment for the backhaul downlink data transmission.

13. The RN according to claim 8, wherein the subframe pattern for backhaul uplink transmission on the first uplink CC forms a subframe pattern for backhaul downlink reception on a first downlink CC and an HARQ operation.

14. The RN according to claim 13, wherein the subframe pattern for backhaul downlink reception on the first downlink CC is a 10 ms-period pattern or a 40 ms-period pattern in subframes other than subframes in which configuration of MBSFN subframes are restricted.

\* \* \* \* \*